(12) United States Patent
Strasser et al.

(10) Patent No.: US 8,972,627 B2
(45) Date of Patent: Mar. 3, 2015

(54) APPARATUS, SYSTEM, AND METHOD FOR MANAGING OPERATIONS FOR DATA STORAGE MEDIA

(75) Inventors: John Strasser, Syracuse, UT (US); David Flynn, Sandy, UT (US); Robert Wood, Nwot, CO (US)

(73) Assignee: Fusion-io, Inc., Salt Lake City, UT (US)

( * ) Notice: Subject to any disclaimer, the term of this patent is extended or adjusted under 35 U.S.C. 154(b) by 45 days.

(21) Appl. No.: 13/372,430

(22) Filed: Feb. 13, 2012

(65) Prior Publication Data
US 2012/0203986 A1 Aug. 9, 2012

Related U.S. Application Data

(63) Continuation-in-part of application No. 12/878,987, filed on Sep. 9, 2010, now Pat. No. 8,429,436.

(60) Provisional application No. 61/442,173, filed on Feb. 11, 2011, provisional application No. 61/240,991, filed on Sep. 9, 2009, provisional application No. 61/245,622, filed on Sep. 24, 2009.

(51) Int. Cl.
| | | |
|---|---|---|
| *G06F 3/00* | (2006.01) | |
| *G06F 13/00* | (2006.01) | |
| *G06F 5/00* | (2006.01) | |
| *G06F 13/28* | (2006.01) | |

(Continued)

(52) U.S. Cl.
CPC ............ *G06F 3/0611* (2013.01); *G06F 3/0659* (2013.01); *G06F 3/0688* (2013.01); *G06F 12/0246* (2013.01)
USPC ........ 710/48; 710/5; 710/15; 710/18; 710/33; 710/36; 710/39; 710/40; 710/41; 710/6; 711/154

(58) Field of Classification Search
CPC . G06F 3/0611; G06F 3/0659; G06F 12/0246; G11C 2216/20
See application file for complete search history.

(56) References Cited

U.S. PATENT DOCUMENTS

| | | | |
|---|---|---|---|
| 4,980,861 A | | 12/1990 | Herdt et al. |
| 5,742,787 A | * | 4/1998 | Talreja ........................ 711/103 |

(Continued)

FOREIGN PATENT DOCUMENTS

| | | |
|---|---|---|
| GB | 0123416.0 | 9/2001 |
| WO | 2010053756 | 5/2010 |

OTHER PUBLICATIONS

Shibata "19nm 112.8mm2 64Gb Multi-level Flash Memory with 400Mb/s/pin 1.8V Toggle Mode Interface" Flash Memory Summit 2012, (2012), 30 pages.

(Continued)

*Primary Examiner* — Idriss N Alrobaye
*Assistant Examiner* — Ronald Modo
(74) *Attorney, Agent, or Firm* — Kunzler Law Group, PC

(57) ABSTRACT

An apparatus, system, and method are disclosed for managing operations for data storage media. An adjustment module interrupts or otherwise adjusts execution of an executing operation on the data storage media. A schedule module executes a pending operation on the data storage media in response to adjusting execution of the executing operation. The pending operation comprises a higher execution priority than the executing operation. The schedule module finishes execution of the executing operation in response to completing execution of the pending operation.

29 Claims, 13 Drawing Sheets

(51) Int. Cl.
*G06F 3/06* (2006.01)
*G06F 12/02* (2006.01)

(56) References Cited

U.S. PATENT DOCUMENTS

| | | | |
|---|---|---|---|
| 5,799,200 A | 8/1998 | Brant et al. | |
| 5,805,501 A | 9/1998 | Shiau et al. | |
| 6,278,633 B1 | 8/2001 | Wong et al. | |
| 6,336,174 B1 | 1/2002 | Li et al. | |
| 6,404,647 B1 | 6/2002 | Minne | |
| 6,412,080 B1 | 6/2002 | Fleming et al. | |
| 6,515,909 B1 | 2/2003 | Wooldridge | |
| 6,515,928 B2 | 2/2003 | Sato et al. | |
| 6,552,955 B1 | 4/2003 | Miki | |
| 6,608,793 B2 | 8/2003 | Park et al. | |
| 6,633,950 B1 | 10/2003 | Brown et al. | |
| 6,633,956 B1 | 10/2003 | Mitani | |
| 6,643,181 B2 | 11/2003 | Sofer et al. | |
| 6,735,546 B2 | 5/2004 | Scheuerlein | |
| 6,751,155 B2 | 6/2004 | Gorobets | |
| 6,760,806 B2 | 7/2004 | Jeon | |
| 6,845,053 B2 | 1/2005 | Chevalier | |
| 6,849,480 B1 | 2/2005 | Low et al. | |
| 6,871,257 B2 | 3/2005 | Conley et al. | |
| 6,887,058 B2 | 5/2005 | Fujiwara | |
| 6,977,847 B2 | 12/2005 | Lasser et al. | |
| 7,042,664 B2 | 5/2006 | Gill et al. | |
| 7,057,936 B2 | 6/2006 | Yaegashi et al. | |
| 7,064,994 B1 | 6/2006 | Wu | |
| 7,167,944 B1 | 1/2007 | Estakhri | |
| 7,177,197 B2 | 2/2007 | Cernea | |
| 7,215,580 B2 | 5/2007 | Gorobets | |
| 7,227,777 B2 | 6/2007 | Roohparvar | |
| 7,257,129 B2 | 8/2007 | Lee et al. | |
| 7,263,591 B2 | 8/2007 | Estakhri et al. | |
| 7,340,558 B2 | 3/2008 | Lee et al. | |
| 7,340,581 B2 | 3/2008 | Gorobets et al. | |
| 7,400,537 B2 | 7/2008 | Hemink et al. | |
| 7,403,424 B2 | 7/2008 | Hemink et al. | |
| 7,424,593 B2 | 9/2008 | Estakhri et al. | |
| 7,441,090 B2 | 10/2008 | Estakhri et al. | |
| 7,451,344 B1* | 11/2008 | Rothberg | 714/6.1 |
| 7,457,166 B2 | 11/2008 | Hemink et al. | |
| 7,460,432 B2 | 12/2008 | Warner | |
| 7,463,521 B2* | 12/2008 | Li | 365/185.12 |
| 7,463,532 B2 | 12/2008 | Tran et al. | |
| 7,480,766 B2 | 1/2009 | Gorobets | |
| 7,495,954 B2 | 2/2009 | Ito | |
| 7,499,317 B2 | 3/2009 | Ito | |
| 7,499,338 B2 | 3/2009 | Ito | |
| 7,522,457 B2 | 4/2009 | Hemink et al. | |
| 7,529,905 B2 | 5/2009 | Sinclair | |
| 7,535,766 B2 | 5/2009 | Ito | |
| 7,630,255 B2 | 12/2009 | Yang | |
| 7,631,138 B2 | 12/2009 | Gonzalez et al. | |
| 7,777,652 B2 | 8/2010 | Lee et al. | |
| 7,856,528 B1 | 12/2010 | Frost et al. | |
| 7,908,501 B2 | 3/2011 | Kim et al. | |
| 7,930,589 B2 | 4/2011 | Lavastre et al. | |
| 7,944,762 B2 | 5/2011 | Gorobets | |
| 8,001,334 B2 | 8/2011 | Lee | |
| 8,055,922 B2 | 11/2011 | Brittain et al. | |
| 8,130,551 B2 | 3/2012 | Oowada et al. | |
| 8,364,888 B2 | 1/2013 | Melik-Martirosian et al. | |
| 8,429,436 B2 | 4/2013 | Fillingim et al. | |
| 2002/0066047 A1 | 5/2002 | Olarig | |
| 2002/0199056 A1 | 12/2002 | Ayukawa et al. | |
| 2003/0115405 A1* | 6/2003 | Funyu et al. | 711/106 |
| 2003/0126475 A1 | 7/2003 | Bodas | |
| 2003/0210601 A1 | 11/2003 | Lin et al. | |
| 2004/0003167 A1 | 1/2004 | Kimura et al. | |
| 2004/0177054 A1* | 9/2004 | Stern et al. | 707/1 |
| 2005/0210323 A1 | 9/2005 | Batchelor et al. | |
| 2005/0246558 A1 | 11/2005 | Ku | |
| 2006/0059326 A1 | 3/2006 | Aasheim et al. | |
| 2006/0106990 A1 | 5/2006 | Benhase et al. | |
| 2006/0149916 A1 | 7/2006 | Nase | |
| 2006/0184736 A1 | 8/2006 | Benhase et al. | |
| 2006/0230295 A1 | 10/2006 | Schumacher et al. | |
| 2006/0265624 A1 | 11/2006 | Moshayedi et al. | |
| 2007/0168698 A1 | 7/2007 | Coulson et al. | |
| 2007/0204270 A1 | 8/2007 | Shin | |
| 2007/0230253 A1 | 10/2007 | Kim | |
| 2007/0233938 A1 | 10/2007 | Cho et al. | |
| 2007/0234021 A1 | 10/2007 | Ruberg et al. | |
| 2007/0239926 A1* | 10/2007 | Gyl et al. | 711/103 |
| 2007/0245094 A1 | 10/2007 | Lee et al. | |
| 2007/0274150 A1 | 11/2007 | Gorobets | |
| 2008/0052483 A1 | 2/2008 | Rangarajan et al. | |
| 2008/0059820 A1 | 3/2008 | Vaden et al. | |
| 2008/0080243 A1 | 4/2008 | Edahiro et al. | |
| 2008/0104344 A1 | 5/2008 | Shimozono et al. | |
| 2008/0117686 A1 | 5/2008 | Yamada | |
| 2008/0126686 A1 | 5/2008 | Sokolov et al. | |
| 2008/0266973 A1 | 10/2008 | Sekar et al. | |
| 2008/0282031 A1* | 11/2008 | Tanoue | 711/114 |
| 2008/0301475 A1 | 12/2008 | Felter | |
| 2009/0037778 A1 | 2/2009 | Resnick | |
| 2009/0091979 A1 | 4/2009 | Shalvi | |
| 2009/0091996 A1 | 4/2009 | Chen et al. | |
| 2009/0150621 A1 | 6/2009 | Lee | |
| 2009/0157989 A1 | 6/2009 | Karamcheti et al. | |
| 2009/0239468 A1 | 9/2009 | He et al. | |
| 2010/0049913 A1 | 2/2010 | Marcu et al. | |
| 2010/0102999 A1 | 4/2010 | Lee et al. | |
| 2010/0106917 A1 | 4/2010 | Ruberg et al. | |
| 2010/0153680 A1 | 6/2010 | Baum | |
| 2010/0257304 A1 | 10/2010 | Rajan et al. | |
| 2010/0262738 A1 | 10/2010 | Swing et al. | |
| 2010/0262740 A1 | 10/2010 | Borchers et al. | |
| 2010/0262757 A1 | 10/2010 | Sprinkle et al. | |
| 2010/0262758 A1 | 10/2010 | Swing et al. | |
| 2010/0262759 A1 | 10/2010 | Borchers et al. | |
| 2010/0262760 A1 | 10/2010 | Swing et al. | |
| 2010/0262761 A1 | 10/2010 | Borchers et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262894 A1 | 10/2010 | Swing et al. | |
| 2010/0262979 A1 | 10/2010 | Borchers et al. | |
| 2010/0268974 A1 | 10/2010 | Floyd et al. | |
| 2010/0332871 A1 | 12/2010 | Allalouf et al. | |
| 2011/0208911 A1 | 8/2011 | Taguchi et al. | |
| 2012/0254515 A1 | 10/2012 | Melik-Martirosian et al. | |
| 2014/0215175 A1 | 7/2014 | Kasorla et al. | |

OTHER PUBLICATIONS

Agrawal et al. "ECC and Signal Processing Technology for Solid State Drives and Multi-bit per cell NAND Flash Memories" Forward Insights, Report No. FI-NFL-FSP-0110, (Jan. 2010), 174 pages.
2380.2.34pct1, PCT/US2010/048321, International Search Report, Apr. 28, 2011.
2380.2.34pct2, PCT/US2010/048320, International Search Report, Apr. 28, 2011.
Leventhal, Adam, Flash Storage Memory, Communications of the ACM, vol. 51, No. 7, Jul. 2008.
2380.2.34US1, Notice of Allowance, Application No. 12878981, Jun. 25, 2012.
The International Bureau of WIPO, International Preliminary Report on Patentability for PCT/US2012/024927, dated Aug. 13, 2013.
Advanced Micro Devices, Inc., Am29DL322D/323D/324D Data Sheet, Publication No. 21534, Revision D, Amendment +7, Issue Date Oct. 7, 2004.
U.S. Appl. No. 13/800,628, Office Action, Dec. 5, 2014.

* cited by examiner

APPARATUS, SYSTEM, AND METHOD FOR MANAGING OPERATIONS FOR DATA STORAGE MEDIA

CROSS-REFERENCES TO RELATED APPLICATIONS

This application claims priority to U.S. Provisional Patent Application No. 61/442,173 entitled "APPARATUS, SYSTEM, AND METHOD FOR MANAGING THROUGHPUT IN A STORAGE DEVICE" and filed on Feb. 11, 2011 for John Strasser, et al. and to U.S. patent application Ser. No. 12/878,987 entitled "APPARATUS, SYSTEM, AND METHOD FOR POWER REDUCTION IN A SOLID-STATE STORAGE DEVICE" and filed on Sep. 9, 2010 for Lance L. Smith, et al., and to U.S. Provisional Patent Application No. 61/245,622 entitled "APPARATUS, SYSTEM, AND METHOD FOR POWER REDUCTION IN A SOLID-STATE STORAGE DEVICE" and filed on Sep. 24, 2009 for Lance L. Smith, et al., each of which are incorporated herein by reference.

FIELD OF THE INVENTION

This invention relates to reducing solid state storage media management latency and more particularly relates to mitigating operation latency in a multi-bank architecture using nonvolatile solid-state storage media.

BACKGROUND

Description of the Related Art

Bulk write operations and bulk erase operations have been used to mask the differences in latency in performing read operations and write operations on certain nonvolatile solid-state storage media. This latency characteristic is referred to as asymmetric read/write latency. In addition, before certain nonvolatile storage media can be re-used, the storage media must be erased. This is often referred to as an erase-before-write requirement. One problem is that during the lengthy erase operation other operations often must wait before being executed. This contention for a common resource is problematic as it can reduce the overall performance of storage media.

An erase operation is considered a management operation since it is generally not initiated by a storage I/O request from a storage client such as a file system, operating system or other application using nonvolatile solid-state storage media. Such management operations may be referred to as overhead since the operations may be needed to properly operate the nonvolatile solid-state storage media, but are not directly related to servicing an I/O request. Consequently, the latency for a read or a write operation may increase due to a wait time for a pending operation such as an erase operation to the same nonvolatile solid-state storage media. Often read and write operations over a given period of time comprise throughput for a nonvolatile solid-state storage device, and delays caused by a management operation such as an erase operation may decrease throughput.

SUMMARY

From the foregoing discussion, it should be apparent that a need exists for an apparatus, system, and method that manage operations, and/or increase throughput for data storage media.

The present invention has been developed in response to the present state of the art, and in particular, in response to the problems and needs in the art that have not yet been fully solved by currently available operation management techniques. Accordingly, the present invention has been developed to provide an apparatus, system, and method for managing Input/Output (IO) operations that overcome many or all of the above-discussed shortcomings in the art.

A method of the present invention is presented for managing operations for data storage media. In one embodiment, the method includes adjusting execution of an executing operation on the data storage media. The method, in a further embodiment, includes executing a pending operation on the data storage media in response to adjusting execution of the executing operation. The pending operation, in certain embodiments, comprises a higher execution priority than the executing operation. In another embodiment, the method includes finishing execution of the executing operation in response to completing execution of the pending operation.

In one embodiment, adjusting execution of the executing operation comprises interrupting execution of the executing operation so that the pending operation executes before the executing operation completes. The executing operation, in various embodiments, may comprise a cumulative command, a multi-phase command, or the like. In one embodiment, the executing operation comprises an erase operation and the pending operation comprises a read operation. A higher execution priority, in certain embodiments, comprises the pending operation having a shorter execution time than the executing operation.

In one embodiment, the executing operation and the pending operation are each configured for execution on a plurality of storage elements. The storage elements, in a further embodiment, are coupled to execute operations in parallel so that a single operation executes on the storage elements at a time. For example, the plurality of storage elements may comprise a single bank of non-volatile solid-state storage elements coupled in parallel.

The method, in one embodiment, includes dynamically adapting one or more characteristics of a subsequent adjustment for a subsequent operation in response to a change in one or more characteristics of the data storage media over time. In another embodiment, the method includes readjusting execution of the executing operation prior to finishing execution of the executing operation in response to a subsequent pending operation comprising a higher execution priority than the executing operation.

In one embodiment, finishing execution comprises finishing execution of the executing operation without readjusting execution of the executing operation in response to one or more subsequent pending operations comprising a higher execution priority than the executing operation so that the executing operation completes execution within a predetermined time period. In another embodiment, adjusting execution occurs at a predefined periodic interval. In a further embodiment, adjusting execution occurs in response to detecting the pending operation.

The executing operation, in one embodiment, comprises a native multi-phase non-volatile storage media primitive command configured to allow execution of other operations between phases of the native multi-phase non-volatile storage media primitive command. In another embodiment, the executing operation comprises a data storage device management operation for the data storage media. The pending operation, in a further embodiment, comprises an I/O operation for the data storage media.

Another method to manage operations for data storage media in accordance with the present invention is presented. In one embodiment, the method includes adjusting execution of a first operation on data storage media. In another embodiment, the method includes executing a pending operation on the data storage media in response to adjusting execution of the first operation. The pending operation, in certain embodiments, comprises a higher execution priority than the executing operation. The method, in a further embodiment, includes executing the first operation in response to completing execution of the pending operation.

In one embodiment, adjusting execution of the first operation comprises selecting operations from one or more queues of operations to be executed such that the pending operation executes prior to the first operation. In certain embodiments, the first operation is inserted into the one or more queues prior to the pending operation so that the first operation and the pending operation execute out of a received order.

An apparatus to manage operations for data storage media is provided with a plurality of modules configured to functionally execute the steps of managing the operations, substantially as described above with regard to the presented methods. These modules in the described embodiments include an adjustment module and a schedule module.

In one embodiment, the adjustment module interrupts or otherwise adjusts execution of an executing operation on data storage media. The schedule module, in one embodiment, executes a pending operation on the data storage media in response to interrupting execution of the executing operation. The pending operation, in certain embodiments, has a shorter execution time than the executing operation. In a further embodiment, the schedule module finishes execution of the executing operation in response to completing execution of the pending operation.

The executing operation, in one embodiment, comprises an erase operation. In a further embodiment, the pending operation comprises a read operation received during execution of the erase operation. The executing operation and the pending operation, in certain embodiments, are each configured for execution on a single bank of non-volatile solid-state storage elements coupled to execute operations in parallel so that a single operation executes on the bank of storage elements at a time.

A system of the present invention is also presented to manage operations for data storage media. The system may be embodied by non-volatile solid-state data storage media and a storage controller for the non-volatile solid-state data storage media. The storage controller, in a further embodiment, may comprise an adjustment module and a schedule module substantially as described above with regard to the presented apparatus. The system, in another embodiment, includes a host device and a data storage device comprising the data storage media. The data storage device, in certain embodiments, is in communication with the host device over one or more communication buses. In one embodiment, at least a portion of the storage controller comprises a device driver for the data storage device executing on a processor of the host device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
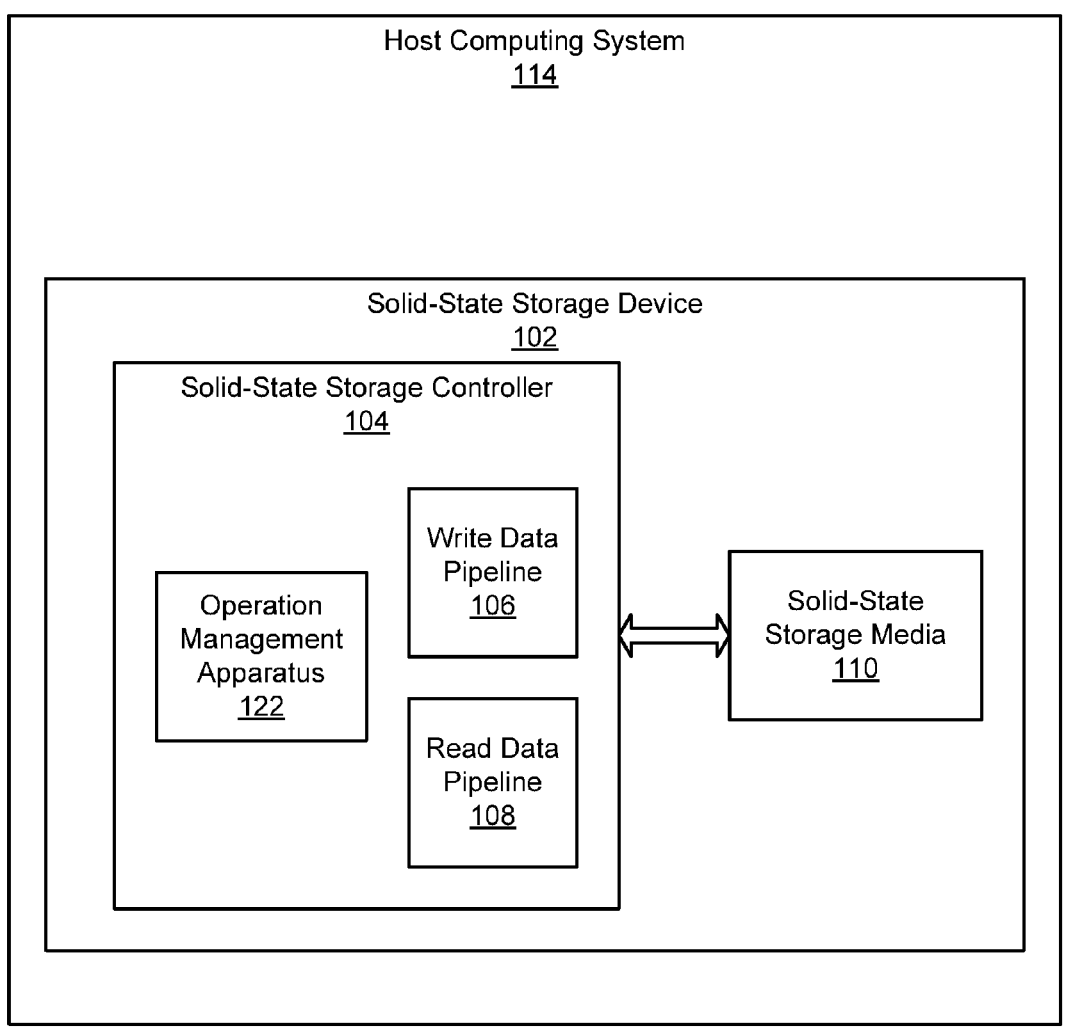
FIG. 1 is a schematic block diagram illustrating one embodiment of a system including a storage device with an operation management apparatus.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

System for Managing Operations for Data Storage Media

FIG. 1 depicts one embodiment of a system 100 for managing operations for data storage media 110 in a storage device 102 or the like. In certain situations, it is beneficial to manage execution of storage operations for data storage media 110 to increase throughput, reduce operation latency, provide a consistent operation latency, or the like. In the depicted embodiment, the system 100 includes a host computing system 114, an operation management apparatus 122, and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a nonvolatile solid-state storage device 102 comprising a solid-state storage controller 104, a write data pipeline 106, a read data pipeline 108, and nonvolatile solid-state storage media 110. The storage device 102 may contain additional components that are not shown in order to provide a simpler view of the storage device 102.

The solid-state storage media 110, in certain embodiments, is nonvolatile, storing data such that the data is retained even when the storage device 102 is not powered. In other embodiments, the solid-state storage media 110 may comprise volatile storage media that does not retain data when the storage device 102 is not powered, or may comprise a combination of volatile and nonvolatile media. Examples of solid-state storage media 110 include flash memory, nano random access memory ("NRAM"), magneto-resistive RAM ("MRAM"), dynamic RAM ("DRAM"), phase change RAM ("PRAM"), Racetrack memory, Memristor memory, and nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), and the like. While, in the depicted embodiment, the storage device 102 includes solid-state storage media 110, in other embodiments, the storage device 102 may include magnetic media such as hard disks, tape, and the like, optical media, or other nonvolatile data storage media. The storage device 102 also includes a storage controller 104 that coordinates the storage and retrieval of data in the solid-state storage media 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the solid-state storage media 110. These operations may include, for example, error correction code (ECC) generation, encryption, compression, and others. The read data pipeline 108 may perform similar and potentially inverse operations on data that is being read out of solid-state storage media 110 and sent to the host computing system 114.

In one embodiment, the host computing system 114 includes one or more other components in addition to the storage device 102, such as additional storage devices, processors, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

The system 100, in the depicted embodiment, also includes an operation management apparatus 122. In certain embodiments, the operation management apparatus 122 may be implemented as part of the storage controller 104. In further embodiments, the operation management apparatus 122 may be, for instance, implemented as part of a software driver of the host computing system 114, implemented in firmware for the storage device 102, or the like. In other embodiments, the operation management apparatus 122 may be implemented partially in a software driver and partially in the storage controller 104, or the like.

The operation management apparatus 122, in one embodiment, monitors data storage requests received by the storage device 102 and/or storage controller 104. The data storage requests are sent by a storage client operating in the host computing system 114. Representative examples of storage clients include an operating system, a file system, a database management system and the like. The storage requests generally comprise two different types: Input/Output (I/O) operations and storage device management operations (a type of management operation). I/O operations generally comprise read requests that request that the storage device 102 read one or more blocks/sectors/packets of data off the solid-state storage media 110, write requests that request that the storage device 102 store or record data for one or more blocks/sectors/packets onto the solid-state storage media 110, and discard or TRIM requests that indicate that the storage device 102 may remove, delete, erase, or ignore one or more blocks/sectors/packets of data because the storage client no longer uses those blocks/sectors/packets. Storage device management operations comprise requests to adjust, modify, or configure how the storage device 102 and/or the storage media 110 operate. Storage device management operations may comprise global management operations that apply to the whole storage device 102 or local/internal management operations that facilitate operation of the storage device 102 and/or the associated storage media 110.

Global management operations may be initiated by a storage client and/or a user using a user interface such as a command line interface of graphical user interface. Examples of global management operations include operations such as formatting the device 102, bringing the device on line, and the like. Internal management operations are generally initiated by the storage controller 104, storage device 102, and/or software configured to operate, manage, and interface with the storage device 102 such as a device driver.

Generally, the execution and implementation of the internal management operations is transparent to the storage client and/or user. Examples of internal management operations include an erase operation, bulk write operations, bulk read operations, and the like. Bulk write operations and bulk read operations, in certain embodiments, may have a component that relates to an internal management operation and a component that relates to an I/O operation. For example, a write request may originate from a storage client to write a single block of data. Within the controller 104, the storage device 102 may collect a number blocks worth of write request data before sending all the write data to the storage media 110 using a single bulk write operation. Thus, part of the bulk write operation relates to the write storage request and part relates to the architecture of the storage controller 104 and how writes are initiated in bulk internally.

To the storage client and/or user the internal management operations may be considered overhead in using the storage device 102. This overhead is irrelevant, unless it decreases the speed at which the storage device 102 services storage requests. The rate at which storage requests, such as I/O operations are serviced is referred to herein as throughput or I/O operations per second (IOPS). The time between receiving a storage request and completing execution of the storage request is referred to as latency. When the internal management operations reduce TOPS, throughput, and/or increase latency, the user and storage client are negatively affected. Certain storage clients also benefit from consistent latency, and changes in latency, such as those caused by periodic erase operations, negatively affect those storage clients.

The operation management apparatus 122 manages storage requests of different priorities such that throughput is maximized and latency is minimized for higher priority operations but lower priority operations, such as internal management operations, are also completed. In certain embodiments, the operation management apparatus 122 uses operation execution priorities to defer completing internal management operations or other low priority operations, to interrupt executing operations, or the like as described below. For example, in one embodiment, the operation management apparatus 122 may interrupt an executing operation, such as an erase operation or write operation, to allow a pending operation with a higher execution priority, such as a read operation, to execute before the executing operation completes.

Solid-State Storage Device

Figure 2:
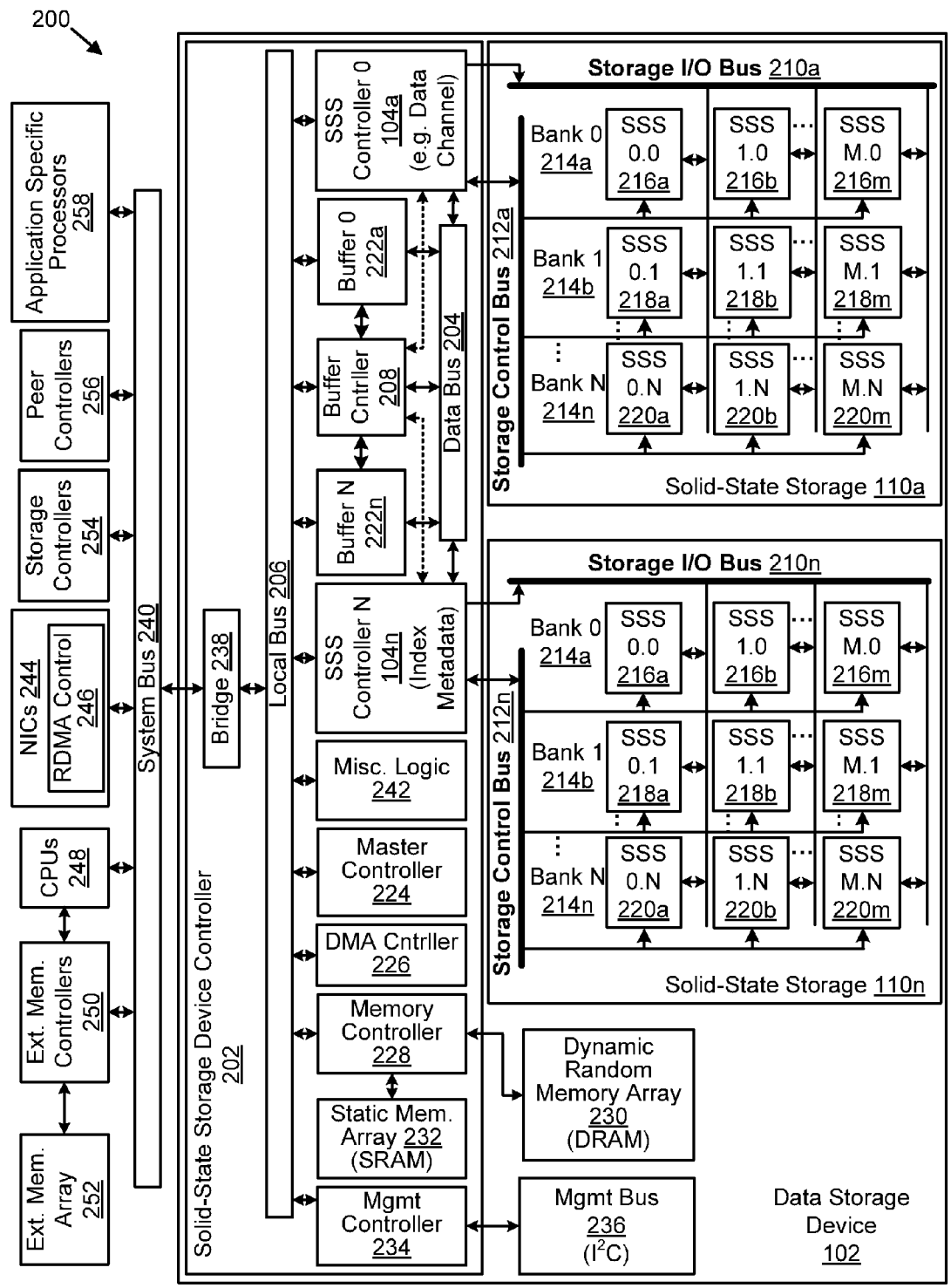
FIG. 2 is a schematic block diagram illustrating one embodiment of a solid-state storage device controller for a data storage device.

FIG. 2 is a schematic block diagram illustrating one embodiment 200 of solid-state storage device controller 202 that includes a write data pipeline 106 and a read data pipeline 108 in a solid-state storage device 102 in accordance with the present invention. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid state controllers 104a-104n−1, coupled to their associated solid-state storage media 110a-110n−1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a row of solid-state storage elements 216a, 216b, 216m is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. Of course different embodiments may include different values for n and m. In one embodiment, a solid-state storage media 110a includes twenty solid-state storage elements 216, 218, 220 per bank 214 with eight banks 214. In one embodiment, the solid-state storage media 110a includes twenty four solid-state storage elements 216, 218, 220 per bank 214 with eight banks 214. In addition to the n×m storage elements 216, 218, 220, one or more additional columns (P) may also be addressed and operated in parallel with other solid-state storage elements 216a, 216b, 216m for one or more rows. The added P columns in one embodiment, store parity data for the portions of an ECC chunk (i.e. an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In one embodiment, solid-state storage elements that share a common storage I/O bus 210a (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 8.0) 216a-220a, each in a separate bank 214a-n. In another embodiment, 24 storage elements (e.g. SSS 0.0-SSS 0.24) 216 form a logical bank 214a so that each of the eight logical banks has 24 storage elements (e.g. SSS 0.0-SSS 8.24) 216, 218, 220. Data is sent to the solid-state storage media 110 over the storage I/O bus 210 to all storage elements of a particular group of storage elements (SSS 0.0-SSS 8.0) 216a, 218a, 220a. The storage control bus 212a is used to select a particular bank (e.g. Bank 0 214a) so that the data received over the storage I/O bus 210 connected to all banks 214 is written just to the selected bank 214a.

In a one embodiment, the storage I/O bus 210 is comprised of one or more independent I/O buses ("IIOBa-m" comprising 210a.a-m, 210n.a-m) wherein the solid-state storage elements within each column share one of the independent I/O buses that accesses each solid-state storage element 216, 218, 220 in parallel so that all banks 214 are accessed simultaneously. For example, one channel of the storage I/O bus 210 may access a first solid-state storage element 216a, 218a, 220a of each bank 214a-n simultaneously. A second channel of the storage I/O bus 210 may access a second solid-state storage element 216b, 218b, 220b of each bank 214a-n simultaneously. Each row of solid-state storage element 216a, 216b, 216m is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2000 bytes ("2 kB"). In one example, a solid-state storage element (e.g. SSS 0.0) includes two registers and can program two pages so that a two-register solid-state storage element 216, 218, 220 has a capacity of 4 kB. A bank 214 of 20 solid-state storage elements 216a, 216b, 216m would then have an 80 kB capacity of pages accessed with the same address going out the channels of the storage I/O bus 210.

This group of pages in a bank 214 of solid-state storage elements 216a, 216b, 216m of 80 kB may be called a logical page or virtual page. Similarly, an erase block of each storage element 216a-m of a bank 214a may be grouped to form a logical erase block or a virtual erase block. In one embodiment, an erase block of pages within a solid-state storage element 216, 218, 220 is erased when an erase command is received within a solid-state storage element 216, 218, 220. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, 218, 220, wherein the packet is intended to be written to a location within a particular page which is specific to a particular physical erase block of a particular storage element of a particular bank, a physical address is sent on the storage I/O bus 210 and followed by the packet. The physical address contains enough information for the solid-state storage element 216, 218, 220 to direct the packet to the designated location within the page. Since all storage elements in a column of storage elements (e.g. SSS 0.0-SSS N.0 216a, 218a, 220a) are accessed simultaneously by the appropriate bus within the storage I/O bus 210a.a, to reach the proper page and to avoid writing the data packet to similarly addressed pages in the column of storage elements (SSS 0.0-SSS N.0 216a, 218a, 220a), the bank 214a that includes the solid-state storage element SSS 0.0 216a with the correct page where the data packet is to be written is simultaneously selected by the storage control bus 212.

Similarly, satisfying a read command on the storage I/O bus 210 requires a simultaneous signal on the storage control bus 212 to select a single bank 214a and the appropriate page within that bank 214a. In one embodiment, a read command reads an entire page, and because there are multiple solid-state storage elements 216a, 216b, 216m in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g. Bank 0 214a) is selected over the storage control bus 212 to prevent erasure of similarly addressed erase blocks in all of the banks (Banks 1-N 214b-n). Alternatively, no particular bank (e.g. Bank 0 214a) is selected over the storage control bus 212 to enable erasure of similarly addressed erase blocks in all of the banks (Banks 1-N 214b-n) simultaneously. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage media 110. For example, packets are streamed to the storage write buffers of a bank 214a of storage elements 216 and when the buffers are full, the packets are programmed to a designated logical page. Packets then refill the storage write buffers and, when full, the packets are written to the next logical page. The next logical page may be in the same bank 214a or another bank (e.g. 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, a new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically the solid-state storage controller(s) 104 communicate data to the solid-state storage media 110 over a storage I/O bus 210. In a typical embodiment where the solid-state storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of data independent busses 204. In one embodiment, each storage I/O bus 210 accessing a column of storage elements (e.g. 216a, 218a, 220a) may include a logical-to-physical mapping for storage divisions (e.g. erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110a-n, the master controller 224 divides the work load among internal controllers, such as the solid-state storage controllers 104a-n. For example, the master controller 224 may divide an object to be written to the data storage devices (e.g. solid-state storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple logical devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248.

Note that the external memory controllers 250 and external memory arrays 252 are called external because they are external to the storage device/solid-state storage device 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In one embodiment the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
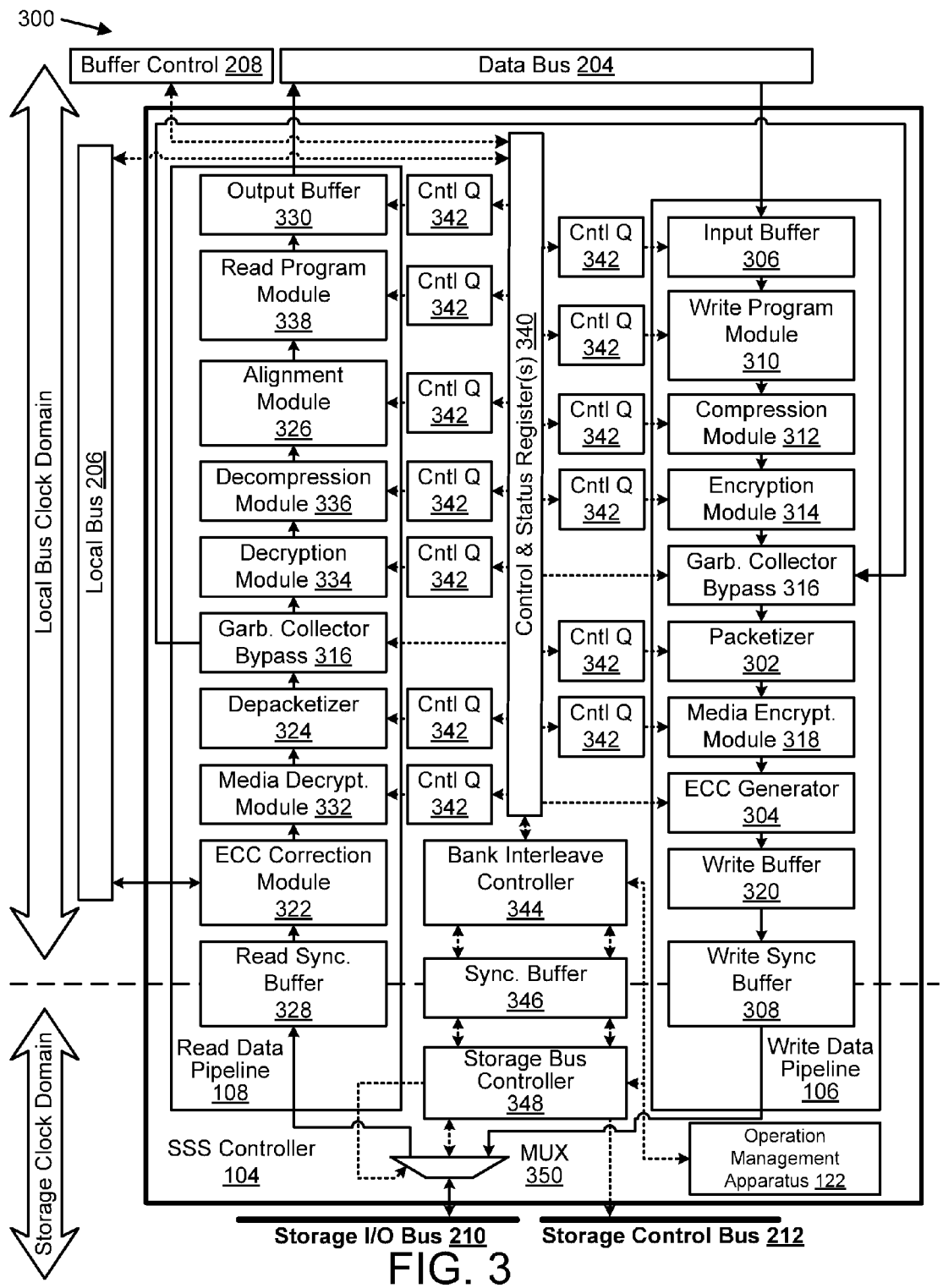
FIG. 3 is a schematic block diagram illustrating one embodiment of a solid-state storage controller with a write data pipeline and a read data pipeline in a data storage device.

FIG. 3 is a schematic block diagram illustrating one embodiment 300 of a solid-state storage controller 104 with a write data pipeline 106, a read data pipeline 108 and an operation management apparatus 122 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the solid-state storage device 102 in data segments streamed to the solid-state storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicates the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the ECC algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synchronization buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the solid-state storage controller 104 from one of a solid-state storage device 102, host computing system 114, computer, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102, if the solid-state storage media 110 is connected to a different solid-state storage controller 104, solid-state storage device 102, or host computing system 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that computing systems 114 or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4A:
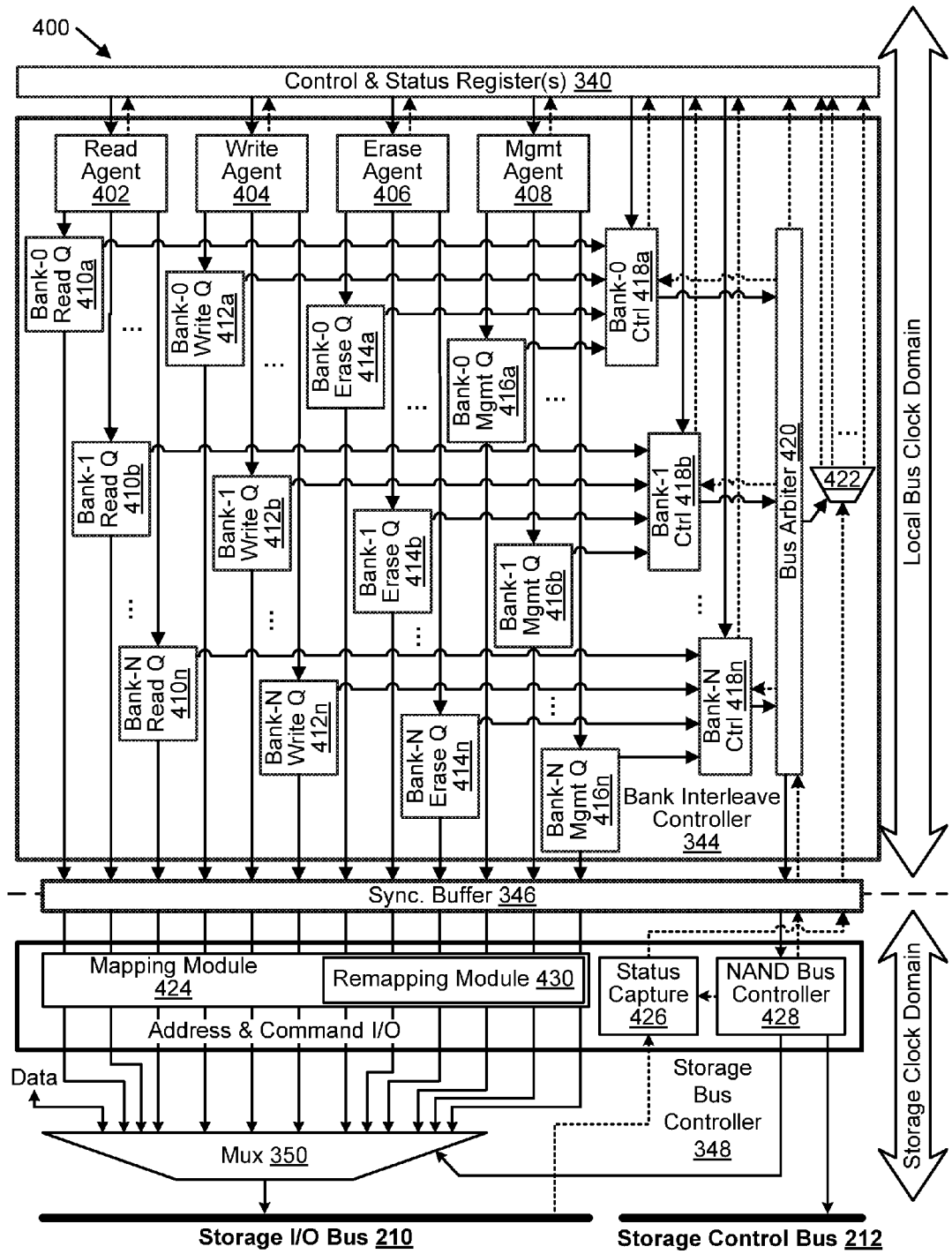
FIG. 4A is a schematic block diagram illustrating one embodiment of a bank interleave controller in a solid-state storage controller.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4A. The operation management apparatus 122 is coupled to the bank interleave controller 344 and storage bus controller 348, in certain embodiments. The operation management apparatus 122 is described in relation to FIG. 4A.

Bank Interleave

FIG. 4A is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 304 and coordinates among the banks 214 of the solid-state storage media 110 execution of the commands stored in the queues, such that a command of a first type executes on one bank 214a while a command of a second type executes on a second bank 214b. In one embodiment, the one or more commands may be separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read commands, discard/TRIM commands, and write commands and queues 410, 412 (e.g. I/O operations), but may also include other commands and queues that are storage media specific. For example, in the embodiment depicted in FIG. 4A, erase and management queues 414, 416 are included and would be appropriate for flash memory, NRAM, MRAM, DRAM, PRAM, etc. In other words, while an erase command is a type of storage device management operation, the interleave controller 344 may include a separate erase queue 414 for such commands. In other embodiments, discard/TRIM, erase, and other similar commands are other examples of storage device management operations. In certain embodiments, the interleave controller 344 uses one of a variety of scheduling algorithms to ensure that the scarce resource (access to a bank) is most efficiently scheduled.

For other types of solid-state storage media 110, other types of commands and corresponding queues may be included without straying from the scope of the invention. The flexible nature of an FPGA solid-state storage controller 104 allows flexibility in what type of storage media is used. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4A, the bank interleave controller 344 includes, for each bank 214, a read queue 410 for commands to read data from the solid-state storage media 110, a write queue 412 for write commands to the solid-state storage media 110, an erase queue 414 for commands to erase an erase block in the solid-state storage, an a management queue 416 for management operations. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management operations, status requests, and the like, such as a reset command or a request to read a configuration register of a bank 214, such as bank-0 214a. The management agent 408 sends the management operation to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

In one embodiment, the bank interleave controller 344 may coordinate with the agents 402, 404, 406, 408 to monitor storage requests received by the control and status registers 340. In certain embodiments, the bank interleave controller 344 may monitor storage requests to identify the storage requests and determine whether the ordering of the storage request in the queues 410, 412, 414, 416 satisfy an operation order criteria. An operation order criteria is criteria for controlling the order of operation execution within the solid state storage controller 104.

In one embodiment, the order of operation execution may be managed by the bank interleave controller 344. In one embodiment, the operation order criteria may comprise a strict ordering in a FIFO order without regard to the types of operations in the queues. In another embodiment, the operation order criteria may change the ordering of commands queued for a particular bank based on the type of operations queued and the relationship of the operations to each other in the queue.

In one embodiment, the operation order criteria may change the ordering of commands queued for a particular bank based on one or more I/O operations being queued behind one or more data storage device management operations. As explained above, I/O operations may comprise read operations, write operations, and/or TRIM/discard operations. These operations have latencies or execution times that may vary for certain storage media 110. For example, with flash storage media 110 write operations have higher latency (in some cases, about an order of magnitude times greater latency) than read operations, and erase operations may have the greatest latency (in some cases, about ten orders of magnitude greater latency than write operations). One reason the bank interleave controller changes the order of operation execution is to prevent or minimize the impact of data storage device management operation latencies on I/O operation latencies. Consequently, the bank interleave controller 344, in one embodiment, monitors storage requests for I/O operations that are queued behind a data storage device management operation. In a particular embodiment, the bank interleave controller 344 monitors storage requests for a read operation queued behind an erase operation on the same bank 214.

In one embodiment, the operation order criteria may change the ordering of commands within a queue of a particular bank based on a first operation queued behind a second operation that has a lower execution priority than the first operation, a longer latency or execution time than the first operation, or the like. The first operation may comprise an I/O operation and the second operation may comprise a data storage device management operation, or vice versa. Each type of operation may be assigned an execution priority that may be independent of the latency associated with executing the operation. For example, a storage client or user may configure the storage device 102 to give read operations a higher execution priority than write operations. Consequently, the bank interleave controller 344 may advance read operations in a queue for the bank 212 ahead of write operations, or vice versa.

In one embodiment, operations are assigned execution priority based at least partially on latency or execution time, and operation types with a shorter execution time may have a higher priority than operation types with a longer execution time. For example, a read operation may have a higher execution priority than an erase operation, a bulk write operation, or the like based on the shorter execution time of the read operation compared to the other operations. In another embodiment, a storage client or user may define execution priorities dynamically using a configuration tool. In a further embodiment, operations may be assigned execution priorities based on source or ownership, with operations from different storage clients or users having different execution priorities based on priorities, quality-of-service levels, or the like of the storage clients or users. One of skill in the art, in light of this disclosure, will recognize other manners in which the operation management apparatus 122 may determine execution priorities for operations.

Certain operations may be strictly ordered, meaning the order the operation is received by the storage controller 104 is retained and remains unchanged. Write operations that include a set barrier parameter are one example of a type of operation that may be strictly ordered. Consequently, with certain strict ordering requirements for certain operation types such as barrier write requests, the barrier write request cannot be processed before a previously received write request from the same storage client. Similarly, in certain embodiments, the bank interleave controller 344 may ensure that a write request for data is serviced prior to a subsequent read request for the same data, to avoid a read-before-write hazard where invalid or stale data is read.

Other operations may be re-ordered by the bank interleave controller 344 in order to optimize performance, provided the re-ordering does not contradict a storage request protocols API. For example, with a conventional block I/O API, storage requests are synchronous such that a subsequent request must wait for an acknowledgement from the first request. If two threads from an application both issue a storage request the conventional block I/O API does not guarantee the order in which the requests will be executed. If the storage client desires a certain order such order may be managed by the application by awaiting acknowledgements and/or issuing barrier write requests and/or using a force unit attention call.

In one embodiment, when the bank interleave controller 344 identifies an I/O operation queued behind a data storage device management operation, the bank interleave controller 344 adjusts the execution order such that the I/O operation is not delayed by the data storage device management operation.

In one embodiment, bank interleave controller 344 makes this adjustment by changing the order of the I/O operation and the data storage device management operation within a queue for a particular bank 212 (e.g. a queue for the bank controller 418 or queues 410, 412, 414, 416). In one embodiment, this may mean that all subcommands for the I/O operation are exchanged in a queue for the bank 212 with subcommands for the data storage device management operation, provided the bus arbiter 420 processes the subcommands in a fixed FIFO order.

In another embodiment, bank interleave controller 344 makes this adjustment by changing the order the I/O operation and the data storage device management operation are processed for a particular bank 212 (e.g. a queue for the bank controller 418). For example, the bank interleave controller 344 may coordinate with the bus arbiter 420, such that the I/O operation (including any of its subcommands) is executed before the data storage device management operation (and any of its subcommands) are executed. This may be accomplished at least in part by changing how the bus arbiter 420 selects operations from the queues 410, 412, 414, 416. In one embodiment, the bank interleave controller 344 may direct the bus arbiter 420 to schedule the I/O operation before the data storage device management operation.

Those of skill in the art, in light of this disclosure, will recognize a variety of different scheduling algorithms that may be used by the bank interleave controller 344 and/or the bus arbiter 420 to ensure that operations that are moved to later in a queue for a bank are not "starved" or "neglected" and eventually will be serviced.

In one embodiment, the operation order criteria does not relate strictly to how operations are queued for execution. In other words, the operation order criteria does not relate strictly to I/O operations and data storage device management operations both concurrently positioned in a common queue for the same bank.

In one embodiment, the operation order criteria comprises receiving an I/O operation during execution of a data storage device management operation. In other words, the operation order criteria relates to a received I/O operation that may, or may not yet be queued, but is addressed to a particular bank which is presently executing a data storage device management operation, or even another I/O operation. In this manner the received operation is ordered to be executed after the presently executing operation, regardless of whether the received operation has yet been queued.

For example, the bank interleave controller 344 may receive a read operation for a packet stored on Bank 1 212. Bank 1 212 presently may be executing an erase operation. If the operation executing is not considered part of the queue for a bank, the erase operation may be considered queued ahead of the read operation received. If the operation executing is not considered part of the queue for a bank, then the executing operation may not be queued ahead of the received read operation.

Regardless of how the "queue" is interpreted, the organization of the bank interleave controller 344 is such that the received operation is ordered to execute following the presently executing operation. Such an ordering of a received operation with respect to an executing operation satisfies the operation order criteria, in one embodiment. If such operation order criteria are satisfied, the bank interleave controller 344 interrupts the executing operation. In the example of a received read operation and an erase operation executing on bank 1 212, the bank interleave controller 344 interrupts the executing erase operation so that the pending read operation may execute on bank 1 212 without waiting for the erase operation to complete.

The bank interleave controller 344 may use a variety of techniques to interrupt an executing operation. In one embodiment, the bank interleave controller 344 issues a reset command to each storage element that comprises the bank executing the operation. For example, the bank interleave controller 344 may issue a reset command to one or more storage elements coupled for parallel command execution so that a single command resets all storage elements of a particular bank. As illustrated in FIG. 2, a reset command sent on storage control bus 212a addressed to bank 0 214a causes each storage element 216a-m to be reset simultaneously. Of course, in other embodiments, the reset lines of each storage element may not be connected in parallel, in which case the bank interleave controller 344 may send the reset command to each storage element of the bank.

A reset command may comprise a solid state storage media interface command that causes the storage element to immediately abort any command currently being executed and transition to a state in which the storage element is prepared to accept a new operation. In certain embodiments, the storage elements of the solid state storage media 110 are configured to respond very quickly to a reset command and are very fast in transitioning to a state to accept a new operation/command.

In another embodiment, the bank interleave controller 344 may turn power off, and promptly turn power on, for one or more storage elements of a bank in order to interrupt an executing operation. This effectively causes the storage element to halt a current operation, and in certain embodiments, once power is restored, enter a "ready" state in which a new operation can be executed. Consequently, how the bank interleave controller 344 interrupts the currently executing operation may depend on the interface between the bank interleave controller 344 and the solid-state storage media 110, the commands supported by the solid-state storage media 110, and the like.

In another embodiment, the solid state storage media 110 (e.g. storage element) may provide one or more multi-phase commands. A multi-phase command is a command that performs a sequence of phases in order to accomplish an end result of the command. Flash media program and erase commands are examples of multi-phase commands. In one embodiment, a multi-phase command is a native non-volatile storage media primitive command provided by the storage element. Multi-phase commands may execute each phase and return the storage element to a state in which a new operation can execute. Alternatively, or in addition, a multi-phase command may organize phases of the command such that interruptions are expected and incur minimal latency when received between phases. Alternatively, or in addition, the multi-phase command may support call-backs that facilitate the bank interleave controller 334 interrupting the multi-phase command and later resuming the multi-phase command. Alternatively, a multi-phase command may facilitate faster interruption of execution of the multi-phase command by eliminating certain phases normally conducted in response to a reset command, power cycling, or the like. Consequently, interruption of a multi-phase command may occur faster than issuing a reset and a new command to a storage element. For example, the data storage media 110 may support an interruptible erase multi-phase command that may be interruptible in response to an interrupt command, may take an input specifying a time at which the command is to be interrupted (e.g. after a specified number of phases), or the like. Multi-phase commands that are dynamically interruptible, in certain embodiments, may automatically resume at a current state of execution in response to a resume command, may provide context information for resuming as described below, or the like, to natively support operation interruption.

In addition, because the bank interleave controller 344 has the context of the operations in the queues and executing on the banks available, the bank interleave controller 344 may selectively schedule multi-phase commands in place of commands that are not designed to accommodate an interruption. In contrast, multi-phase commands are engineered to permit and handle being interrupted during completion of the multi-phase command. A multi-phase command, in certain embodiments, may provide the bank interleave controller 344 with context information, so that the multi-phase command may be resumed after interruption.

Context information indicates the point at which an interrupted command or operation is to be resumed to complete the interrupted command or operation. The bank interleave controller 344, using the context information, may resume a multi-phase command at the same phase, point, or stage at which the command was interrupted, may perform the previously executed stages in an expedited manner, or the like, so that resuming a multi-phase command is more efficient than executing a new command. The context information may comprise a number of steps, phases, stages, or pulses of an operation completed before interruption, a step or stage at which an operation is to resume, or the like. Context information for an erase operation, for example, may include a pulse duration, a pulse strength, a ratchet parameter, an error toleration, or the like that the bank interleave controller 344 may use to interrupt and resume an executing erase operation. In embodiments where such context information is not available, previously executed steps or stages may re-execute in an expedited or accelerated manner, as the steps or stages have already been executed. The context information may comprise a current state of one or more storage cells at the time of the interruption.

In one embodiment, the operation order criteria are defined such that the executing operation is an operation amenable to interruption, or re-ordering, without causing adverse affects on the operation of the storage controller 202 and without causing adverse affects on any I/O operation results or acknowledgements provided by the storage controller 202. In certain embodiments, operations suitable for interruption and/or execution re-ordering may comprise data storage device management operations. As described above, data storage device management operations comprise requests to adjust, modify, perform maintenance on, or configure how the storage device 102 operates. Such operations facilitate efficient operation of the storage device 102.

In certain embodiments, the completion of currently executing data storage device management operations is not critical to the operation of the storage device 102. One example of such a data storage device management operation may be an erase operation. Other data storage device management operations that may be interruptible include a refresh operation, a grooming or data moving/relocating operation, and the like.

In a log-based, append only storage structure (described below in relation to FIG. 5), in which new write requests store data at an append point of a log and physical storage capacity is recovered using a garbage collection process, an erase operation may be deferred, provided the storage device 102 still has sufficient storage capacity for the append point to use. While the data storage device management operation may need to be completed eventually, the operation may be deferred in order to minimize the latency for a later received operation (e.g. a read request to the same bank).

In certain embodiments, a data storage device management operation that is interruptible under normal operating conditions may become non-interruptible due to other operating conditions. For example, in a log-based writing architecture for the storage device 102, as described above, if an erase operation is executing but there is not sufficient storage capacity for the append point to use, such an erase operation may be uninterruptible. Consequently, the operation order criteria may include a predicate that checks a certain flag or other indicator to determine if the executing operation or earlier queued operation can be interrupted. If so, in certain embodiments, the operation order criteria is satisfied and if not the operation order criteria is not satisfied.

In addition, in certain embodiments, an operation that is interrupted, or moved to a later position in a queue, for a bank may be a cumulative operation. As used herein, a cumulative operation is one for which resuming or restarting the operation after the operation is halted does not significantly adversely affect the latency of performing the operation compared to a latency for the operation executing without interruption or being halted. In other words, resuming/restarting a halted cumulative operation may result in a smaller or equal latency than uninterrupted execution of the operation would incur. The effects of the operation before the interruption are cumulative with the resuming of the operation after an interruption.

A program operation and an erase operation are two examples of cumulative operations. Of course, other types of cumulative operations may exist for different types of storage media 110. In certain embodiments, a cumulative operation may be associated with a multi-phase command as described above.

On flash media, a program operation is a multi-phase operation in which the storage elements automatically perform each of the phases before reporting that the operation is completed. Specifically, the storage element applies successively increasing amounts of voltage to storage cells to cause the stored charge in the cell to increase. Then, the storage element reads the value of the cell to determine if the voltage for the cell is within a certain range indicative of having programmed the cell. If so, the storage element stops the programming operation, and returns to a ready state in which a new operation can be performed. If not, the storage element applies another amount of voltage and re-reads the cell to determine if the voltage for the cell is within a certain range indicative of having programmed the cell. This process repeats until a cell of a storage element is programmed. In certain embodiments, the storage element reads the value of the cell to determine if the voltage for the cell is already within a certain range indicative of being programmed before any voltage is applied to cause programming. The same process is performed on multiple cells simultaneously until a sufficient number of cells are properly programmed.

Similarly, an iterative set of multiple phases is performed by the storage elements to erase cells in an erase block of a storage element. The phases may vary depending on how the flash media 110 manufacturers have designed their devices. The bank interleave controller 344 ensures that all storage elements 216a-m of a particular bank 0 214a have completed a particular operation such as a program operation or an erase operation before initiating a subsequent operation.

Consequently, if the bank interleave controller 344 interrupts an executing cumulative operation (e.g. erase operation or program operation) there may be little or no detrimental impact, such as increased latency, when the cumulative operation is resumed or restarted. Advantageously, this means that with sufficiently small overhead for stopping a cumulative operation and switching to a different operation the impact of high latency operations such as a data storage device management operation is mitigated.

Advantageously, the bank interleave controller 344 has sufficient context about the queued operations and the executing operations to determine whether the operation order criteria is satisfied such that re-order of queues is advantageous and/or interruption of an executing operation is advantageous. For example, the operation order criteria may include an indicator of the progress of an executing operation on a bank. For example, if a read operation is received while an erase operation is executing, and the erase operation has been executing for over 75% of the expected execution time, such a time threshold may be so high that the bank interleave controller 344 determines that the operation order criteria is not satisfied. This may be in part because the erase operation has less than 25% of the way time and work remaining until it will complete. Consequently, the overhead in halting the erase and switching to a read operation may be too high in this example.

Such bank operation conditions context is generally not available to the storage elements 216, 218, 220. Consequently, the storage elements may not be in position to determine whether an executing operation should be paused/interrupted/halted. In other embodiments, the operation management apparatus 122 may access and/or manipulate internal registers, ROM, RAM, page buffers, etc. associated with the storage elements 216, 218, 220 to determine context information for executing operations. The operation management apparatus 122 may use the context information to determine whether to interrupt or otherwise adjust an executing operation and/or to determine how and where to resume an operation after it has been interrupted.

In certain embodiments, the bank interleave controller 344 determines that one or more I/O operations queued behind one or more data storage device management operations satisfy the operation order criteria, have a higher execution priority than an executing operation, have a shorter execution time than an executing operation, or the like. For example, five read operations may be received and queued for data on a bank that is currently executing an erase operation. Consequently, the bank interleave controller 344 may stop the erase operation on a particular bank by issuing a reset command and queue the 5 read operations and then return and re-execute or otherwise finish the erase operation. Because the erase operation is cumulative, the erase operation does not have increased latency simply because it was interrupted and then resumed, and the latency for the read operations is significantly reduced due to the interruption of the erase operation. In addition, the one or more I/O operations queued behind one or more data storage device management operations may not be sequential in the queue for a particular bank.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. In certain embodiments, the subcommands comprise multi-phase commands. Additionally, in conjunction with example write command, the storage bus controller 348 will cause the one or more commands to be multiplied to each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. As described above, the bus arbiter 420 cooperates with the bank interleave controller 344 such that the desired operation execution order is accomplished. Of course re-adjusting execution order may be performed by ordering operations in a bank queue 418 or defining an order or prioritization for how the bus arbiter 420 selects the operations from a bank queue 418. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management operations, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write synchronization buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While Bank 0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

Figure 4B:
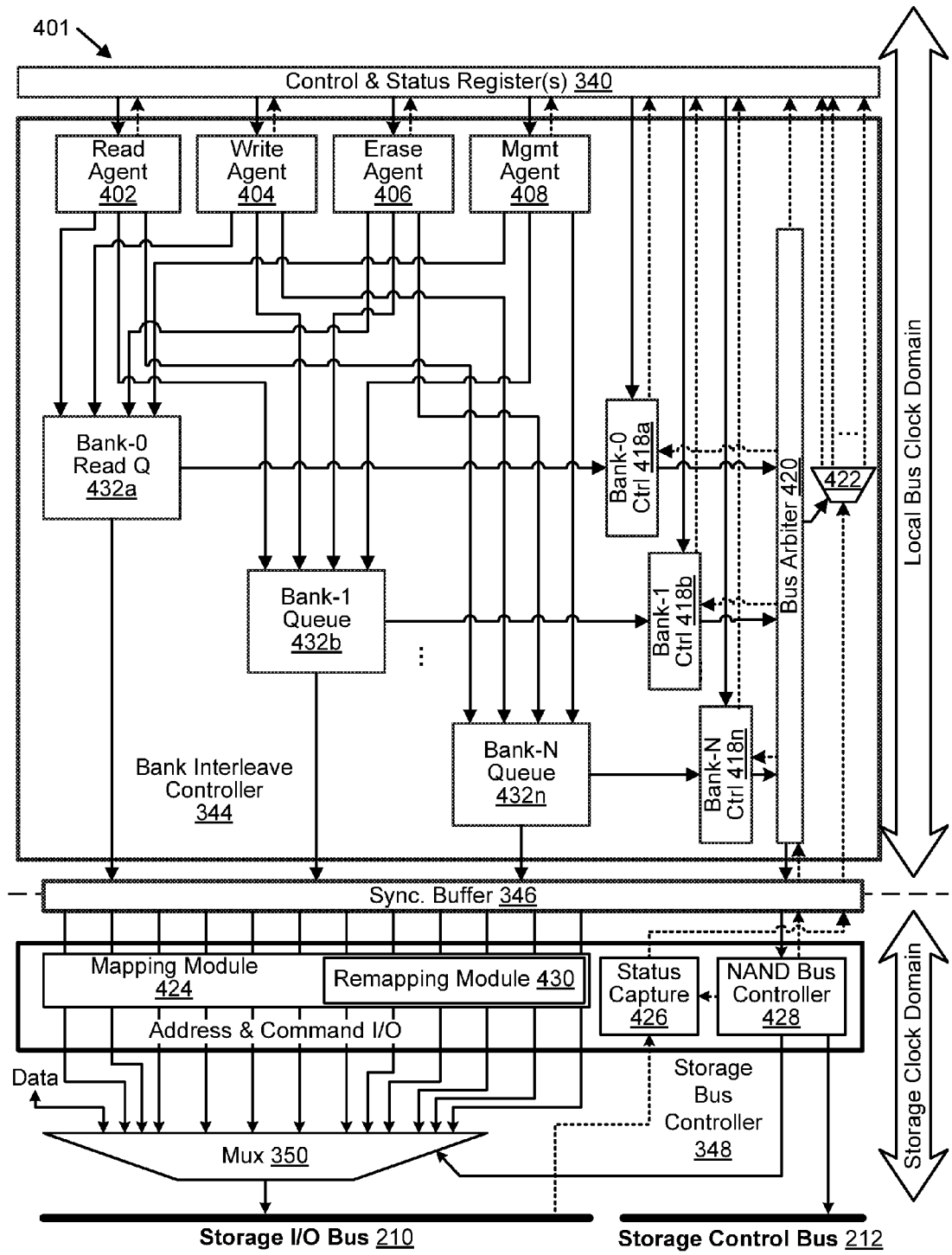
FIG. 4B is a schematic block diagram illustrating an alternate embodiment of a bank interleave controller in the solid-state storage controller in accordance with the present invention.

FIG. 4B is a schematic block diagram illustrating an alternate embodiment 401 of a bank interleave controller in the solid-state storage controller in accordance with the present invention. The components 210, 212, 340, 346, 348, 350, 402-430 depicted in the embodiment shown in FIG. 4B are substantially similar to the bank interleave apparatus 400 described in relation to FIG. 4A except that each bank 214 includes a single queue 432a-n and the read commands, write commands, erase commands, management operations, etc. for a bank (e.g. Bank-0 214a) are directed to a single queue 432a for the bank 214a. The queues 432, in one embodiment, are FIFO. In another embodiment, the queues 432 can have commands pulled from the queues 432 in an order other than the order they were stored. In another alternate embodiment (not shown), the read agent 402, write agent 404, erase agent 406, and management agent 408 may be combined into a single agent assigning commands to the appropriate queues 432a-n.

In another alternate embodiment (not shown), commands are stored in a single queue where the commands may be pulled from the queue in an order other than how they are stored so that the bank interleave controller 344 can execute a command on one bank 214a while other commands are executing on the remaining banks 214b-n. One of skill in the art will easily recognize other queue configurations and types to enable execution of a command on one bank 214a while other commands are executing on other banks 214b-n.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS N.0 216a, 218a, . . . 220a, a second bank interleave controller 344 serves a second column of storage elements SSS 0.1-SSS N.1 216b, 218b, . . . 220b etc.
Storage-Specific Components The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage media 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each column of solid-state storage elements (e.g. SSS 0.0 216a, SSS 1.0 218a, SSS N.0 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0.x to SSS N.x 216, 218, 220) to the MUX 350 for each column of solid-state storage elements (SSS 0.x to SSS N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS 0.M 216) per bank 214a may have a logical address for a particular erase block mapped to twenty physical addresses of the erase block, one physical address per storage element. Because the storage elements are accessed in parallel, erase blocks at the same position in each storage element in a column of storage elements 216a, 218a, 220a will share a physical address. To select one erase block (e.g. in storage element SSS 0.0 216a)

instead of all erase blocks in the row (e.g. in storage elements SSS 0.0, 1.0, . . . N.0 216a, 218a, 220a), one bank (in this case Bank 0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 0.1 216b, . . . , and to storage element 0.M 216m, virtual erase block 2 may be mapped to erase block 2 of storage element SSS 1.0 218a, to erase block 2 of storage element SSS 1.1 218b, . . . , and to storage element 1.M 218m, etc. Alternatively, virtual erase block 1 may be mapped to one erase block from each storage element in an array such that virtual erase block 1 includes erase block 1 of storage element SSS 0.0 216a to erase block 1 of storage element SSS 0.1 216b to storage element 0.M 216m, and erase block 1 of storage element SSS 1.0 218a to erase block 1 of storage element SSS 1.1 218b, . . . , and to storage element 1.M 218m, for each storage element in the array up to erase block 1 of storage element N.M 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 0.1 216b, erase block 1 of storage element SSS 0.2 (not shown) . . . , and to storage element 0.M 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Figure 5:
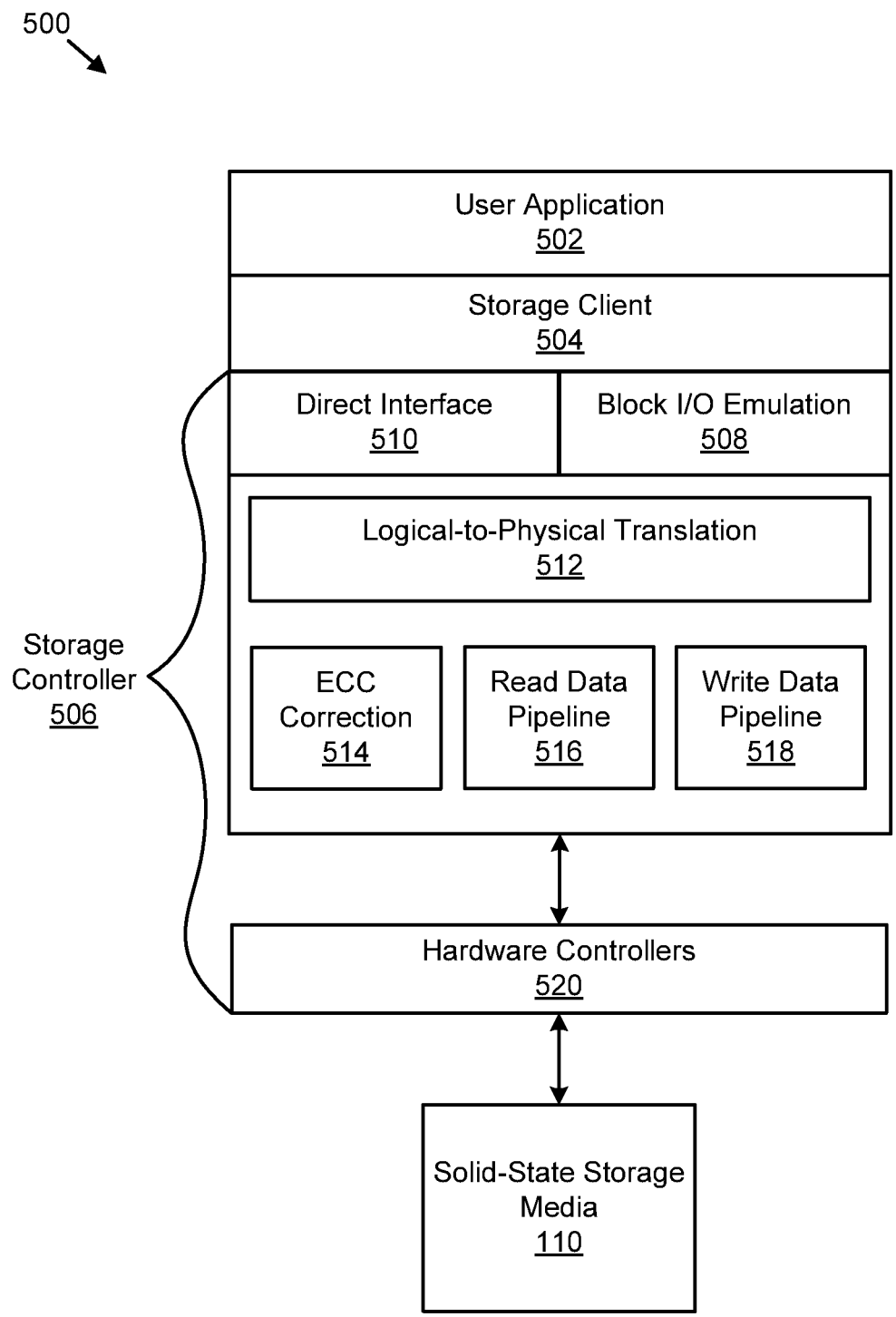
FIG. 5 is a schematic block diagram illustrating one embodiment of a logical representation of a solid-state storage controller with a logical-to-physical translation layer in accordance with the present invention.

FIG. 5 is a schematic block diagram illustrating a logical representation 500 of a solid-state storage controller 506 with a logical-to-physical translation layer 512 in accordance with the present invention. The storage controller 506 may be similar, in certain embodiments, to the solid-state storage controller 104 depicted in FIG. 1 and may include one or more solid-state storage controllers 104. The depicted embodiment shows a user application 502 in communication with a storage client 504. The storage client 504 is in communication with a storage controller 506 that includes the logical-to-physical translation layer 512, an ECC correction module 514, a read data pipeline 516, and a write data pipeline 518.

The storage controller 506 manages solid-state storage media 110. The storage controller 506 may include various hardware and software controllers, drivers, and software, such as the depicted hardware controllers 520.

In one embodiment, the depicted hardware controllers 520 may be substantially similar to and include similar functionality as the solid-state controllers 104 and accompanying controllers and modules depicted in FIGS. 1 and 2 and/or the bank interleave controller 344 and storage bus controller 348 depicted in FIGS. 3, 4A, and 4B. Furthermore, the ECC correction module 514 may be substantially similar and include similar functionality to the ECC correction module 322 and/or the ECC generator 304 depicted in FIG. 3. In addition, the read data pipeline 516 and the write data pipeline 518 may be substantially similar to the read data pipeline 108 and the write data pipeline 106 depicted in FIG. 3. The solid-state storage array 522 may include an array of solid-state storage banks similar to the solid-state storage media 110 and corresponding solid-state storage banks 214 depicted in FIG. 2.

In one embodiment, the user application 502 is a software application operating on or in conjunction with the storage client 504. The storage client 504 manages files and data and utilizes the functions and features of the storage controller 506 and associated solid-state storage array 522. Representative examples of storage clients include, but are not limited to, a server, a file system, an operating system, a database management system ("DBMS"), a volume manager, and the like. The storage client 504 is in communication with the storage controller 506. In one embodiment, the storage client 504 communicates through an Input/Output (I/O) interface represented by a block I/O emulation layer 508.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, certain storage devices 102 do not directly or necessarily associate logical block addresses with particular physical blocks. These storage devices 102 may emulate a conventional block storage interface to maintain compatibility with block storage clients 504.

When the storage client 504 communicates through the block I/O emulation layer 508, the storage device 102 appears to the storage client 504 as a conventional block storage device. In one embodiment, the storage controller 506 provides a block I/O emulation layer 508 which serves as a block device interface, or API. In this embodiment, the storage client 504 communicates with the storage device 102 through this block device interface. In one embodiment, the block I/O emulation layer 508 receives commands and logical block addresses from the storage client 504 in accordance with this block device interface. As a result, the block I/O emulation layer 508 provides the storage device 102 compatibility with block storage clients 504.

In one embodiment, a storage client 504 communicates with the storage controller 506 through a direct interface layer 510. In this embodiment, the storage device 102 directly exchanges information specific to non-volatile storage devices. A storage device 102 using direct interface 510 may store data on the solid-state storage media 110 as blocks, sectors, pages, logical blocks, logical pages, erase blocks, logical erase blocks, ECC chunks, logical ECC chunks, or in any other format or structure advantageous to the technical characteristics of the solid-state storage media 110. The storage controller 506 receives a logical address and a command from the storage client 504 and performs the corresponding operation in relation to the non-volatile solid-state storage media 110. The storage controller 506 may support a block I/O emulation layer 508, a direct interface 510, or both a block I/O emulation layer 508 and a direct interface 510.

As described above, certain storage devices, while appearing to a storage client 504 to be a block storage device, do not directly associate particular logical block addresses with particular physical blocks, also referred to in the art as sectors. Such storage devices may use a logical-to-physical translation layer 512. The logical-to-physical translation layer 512 provides a level of abstraction between the logical block addresses used by the storage client 504, and the physical block addresses at which the storage controller 506 stores the data. The logical-to-physical translation layer 512 maps logical block addresses to physical block addresses of data stored on solid-state storage media 110. This mapping allows data to be referenced in a logical address space using logical identifiers, such as a logical block address. A logical identifier does not indicate the physical location of data on the solid-state storage media 110, but is an abstract reference to the data.

The storage controller 506 manages the physical block addresses in the physical address space. In one example, contiguous logical block addresses may in fact be stored in non-contiguous physical block addresses as the logical-to-physical translation layer 512 determines the location on the solid-state storage media 110 to perform data operations.

Furthermore, in one embodiment, the logical address space is substantially larger than the physical address space. This "thinly provisioned" or "sparse address space" embodiment, allows the number of logical identifiers for data references to greatly exceed the number of possible physical addresses. Specifically, the logical address space may be "sparse" and, as such, may comprise a logical capacity that exceeds the physical storage capacity of the solid-state storage media 110.

Accordingly, the logical address space may be defined independent of the solid-state storage media 110; the logical address space may present a larger address space than the physical storage capacity of the solid-state storage media 110, may present different storage location partitions and/or block sizes than provided by the solid-state storage media 110, and so on.

The storage controller 506 may support a sparse address space by writing data using a log-based, append only writing structure. Specifically, the storage controller 506, in one embodiment, writes data of a write request to physical storage media of the solid-state storage media 110 at one or more logical addresses of the physical storage media corresponding to the addresses of the write request as mapped by the logical-to-physical translation layer 512. In a further embodiment, the storage controller 506 writes the data of the write request by appending the data to a sequential, log-based writing structure of the physical storage media of the solid-state storage media 110 at an append point. The storage controller 506, in one embodiment, returns one or more physical addresses corresponding to the append point and the logical-to-physical translation layer 512 maps the one or more logical addresses to the one or more physical addresses corresponding to the append point.

As the storage controller 506 clears, trims, replaces, expires, and/or evicts, data from the physical addresses and associated physical storage media, the solid state storage media 110 in the depicted embodiment, are freed to store data for other logical addresses. In one embodiment, the storage controller 506 stores data at the physical addresses using a log-based, append only writing structure such that data overwritten by a subsequent write request invalidates other data in the log. Consequently, a garbage collection process recovers the physical capacity of the invalid data in the log. One embodiment of the log-based, append only writing structure is a logically ring-like data structure, as new data is appended to the log-based writing structure, previously used physical capacity is reused in a circular, theoretically infinite manner.

In one embodiment, the logical-to-physical translation layer 512 includes a map or index, a "forward map," that maps logical block addresses to physical block addresses. Often logical addresses used to identify stored data represent a very small number of logical addresses that are possible within a name space or range of possible logical addresses. Searching this sparsely populated space may be cumbersome. For this reason, the forward map is typically a data structure that facilitates quickly traversing the forward map to find a physical address based on a logical address. For example, the forward map may include a B-tree, a content addressable memory ("CAM"), a binary tree, a hash table, or other data structure that facilitates quickly searching a sparsely populated space or range. By using a forward map that quickly searches a sparsely populated logical namespace or address space, the logical-to-physical translation layer 512 provides an efficient way to determine one or more physical addresses from a logical address. In certain embodiments, the logical-to-physical translation layer 512 is a tree with nodes that represent logical block addresses and comprise corresponding physical block addresses.

In one embodiment, the forward map binds, in a logical-to-physical map, bound LBAs to physical storage locations. The storage controller 506 may determine if the logical space has sufficient unallocated logical space using the logical-to-physical map. The logical-to-physical map may be used to track allocation of bound LBAs, unbound LBAs, allocated LBAs, unallocated LBAs, allocated LBA capacity, unallocated LBA capacity, and the like. In one embodiment, the forward map binds LBAs to corresponding physical storage location addresses in multiple maps.

The forward map, the sparse logical address space, and the log-based writing are described in further detail in U.S. patent application Ser. No. 12/986,117 entitled "Apparatus, System, and Method for a Virtual Storage Layer" filed 6 Jan. 2011, for David Flynn et al., and U.S. Provisional Patent Application Ser. No. 61/373,271 entitled "Apparatus, System, and Method for Caching Data" filed 12 Aug. 2010, for David Flynn, which are hereby incorporated by reference.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 with a logical-to-physical translation layer 512 (a storage controller 104 that does not map a logical block address directly to a particular physical block), deletes a logical block address, the corresponding physical block address remains allocated because the storage client 504 does not communicate the change in used blocks to the storage controller 506. The storage client 504 may not be configured to communicate changes in used blocks (also referred to herein as "data block usage information"). Because the storage client 504 uses the block I/O emulation 508 layer, the storage client 504 may erroneously believe that the storage controller 506 is a conventional storage controller that would not utilize the data block usage information. Or, in certain embodiments, other software layers between the storage client 504 and the storage controller 506 may fail to pass on data block usage information.

Consequently, the storage controller 104 preserves the relationship between the logical block address and a physical address and the data on the storage device 102 corresponding to the physical block. As the number of allocated blocks increases, the performance of the storage controller 104 may suffer depending on the configuration of the storage controller 104.

Specifically, in certain embodiments, the storage controller 506 is configured to store data sequentially, using an append-only writing process, and use a storage space recovery process that re-uses non-volatile storage media storing deallocated/unused logical blocks. Specifically, as described above, the storage controller 506 may sequentially write data on the solid-state storage media 110 in a log structured format and within one or more physical structures of the storage elements, the data is sequentially stored on the solid-state storage media 110.

As a result of storing data sequentially and using an append-only writing process, the storage controller 506 achieves a high write throughput and a high number of I/O operations per second ("IOPS"). The storage controller 506 includes a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 512.

As described above, the storage space recovery process determines that a particular section of storage may be recovered. Once a section of storage has been marked for recovery, the storage controller 506 may relocate valid blocks in the section. The storage space recovery process, when relocating valid blocks, copies the packets and writes them to another location so that the particular section of storage may be reused as available storage space, typically after an erase operation on the particular section. The storage controller 506 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices 102 are configured to receive messages or commands notifying the storage device 102 of these unused logical blocks so that the storage device 102 may deallocate the corresponding physical blocks. As used herein, to deallocate a physical block includes marking the physical block as invalid, unused, or otherwise designating the physical block as available for storage space recovery, its contents on storage media no longer needing to be preserved by the storage controller 506. Data block usage information, in reference to the storage controller 506, may also refer to information maintained by the storage controller 506 regarding which physical blocks are allocated and/or deallocated/unallocated and changes in the allocation of physical blocks and/or logical-to-physical block mapping information. Data block usage information, in reference to the storage controller 506, may also refer to information maintained by the storage controller 506 regarding which blocks are in use and which blocks are not in use by a storage client. Use of a block may include storing of data in the block on behalf of the client, reserving the block for use by a client, and the like.

While physical blocks may be deallocated, in certain embodiments, the storage controller 506 may not immediately erase the data on the storage media. An erase operation may be performed later in time. In certain embodiments, the data in a deallocated physical block may be marked as unavailable by the storage controller 506 such that subsequent requests for data in the physical block return a null result or an empty set of data.

One example of a command or message for such deallocation is the "Trim" function of the "Data Set Management" command under the T13 technical committee command set specification maintained by INCITS. A storage device, upon receiving a Trim command, may deallocate physical blocks for logical blocks whose data is no longer needed by the storage client 504. A storage controller 506 that deallocates physical blocks may achieve better performance and increased storage space, especially storage controllers 506 that write data using certain processes and/or use a similar data storage recovery process as that described above.

Consequently, the performance of the storage controller 506 is enhanced as physical blocks are deallocated when they are no longer needed such as through the Trim command or other similar deallocation commands issued to the storage controller 506.

Figure 6:
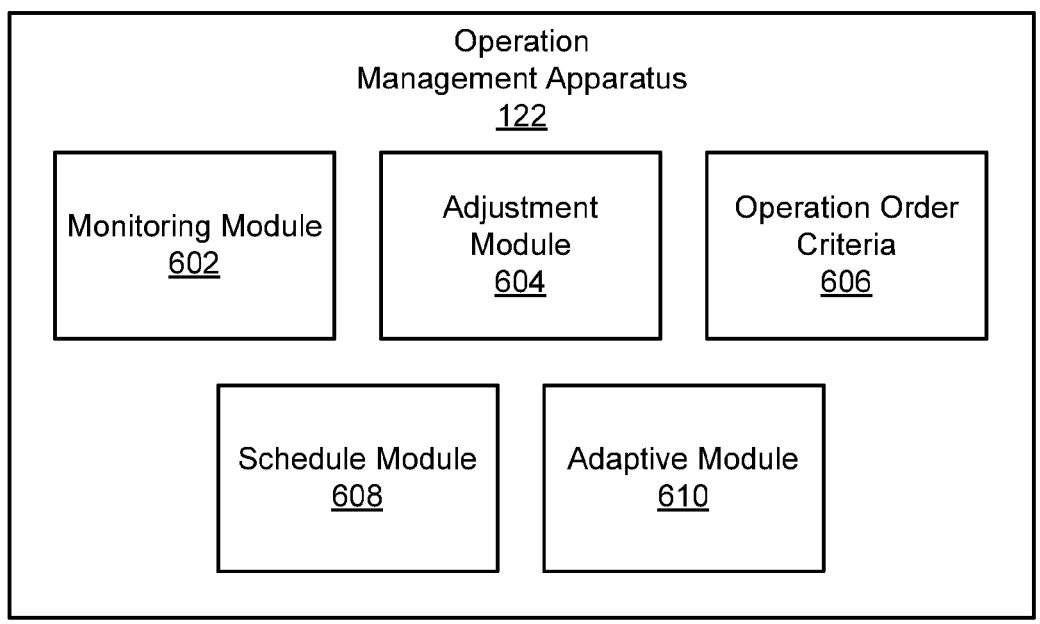
FIG. 6 is a schematic block diagram illustrating one embodiment of an operation management apparatus.

FIG. 6 depicts one embodiment of the operation management apparatus 122. The operation management apparatus 122, in one embodiment, includes a monitoring module 602, an adjustment module 604, and one or more operation order criteria 606.

In general, the monitoring module 602 monitors received data storage requests. The adjustment module 604 adjusts execution of one or more operations on the data storage media 110 in response to the received data storage requests satisfying operation order criteria. As described above, data storage requests may satisfy operation order criteria in response to a pending operation having a higher priority than an executing operation, a pending operation having a shorter execution time than an executing operation, or the like. The operation order criteria 606 defines the thresholds, parameters, predicates and other conditions the monitoring module 602 and adjustment module 604 review in order to determine whether or not to interrupt or otherwise adjust execution of operations within the data storage device 102.

In one embodiment, the operation management module 122 includes a determination module that takes information from the monitoring module 602 and other context information available within the storage controller 104 (such as the bank interleave controller 344) and determines whether or not an operation order criteria 606 has been satisfied. In one embodiment, the operation management module 122 includes a schedule module 608 which communicates with the bank interleave controller 344 to manage an order that operations are performed on the storage device 102, as described above with regard to the bank interleave controller 344 of FIGS. 4A and 4B.

The schedule module 608, in one embodiment, cooperates with the adjustment module 604. The adjustment module 604 may adjust execution of operations by selecting operations from one or more queues of operations to be executed, so that pending operations with greater execution priority, shorter execution times, or the like execute prior to other operations. Such reorganization or selective execution of queued operations may cause operations to execute out of a received order, as described above, to optimize execution latencies.

In embodiments where the adjustment module 604 interrupts execution of an executing operation on the data storage media 110, the schedule module 608 may execute one or more pending operations on the data storage media 110 once the adjustment module 604 has interrupted the executing operation. In response to the pending operations completing execution, the schedule module 608 may finish execution of the executing operation on the data storage media 110.

In one embodiment, the schedule module 608 may return an interrupted operation to an operation queue for later execution on the data storage media 110. In certain embodiments, the schedule module 608 may maintain a scheduling data structure populated with information tracking interrupted operations. If context data for an operation is available, as described above, the schedule module 608 may populate the scheduling data structure with context information enabling the scheduling module 608 to resume execution of the operation. In one embodiment, the adjustment module 604 may interrupt or otherwise adjust multiple operations in a recursive or hierarchical manner, interrupting additional operations during an interruption to a previous operation. The schedule module 608 may track recursive or hierarchical interruptions, so that the schedule module 607 may resume and complete execution of each interrupted operation on the data storage media 110. For example, the schedule module 608 may resume execution of each interrupted operation in a most-recently-interrupted order, to preserve the relative execution priorities of the interrupted operations or the like.

The adjustment module 604, in one embodiment, may interrupt or otherwise adjust an executing operation at a predefined periodic interval. The predefined periodic interval may be relative to an operation, counted from a beginning of the operation itself or the like. For example, the adjustment module 604 may interrupt an operation, such as an erase operation, periodically each 500 microseconds or the like, segmenting the operation into multiple segments or phases so that pending operations may execute between segments. The adjustment module 604, in certain embodiments, may interrupt an operation periodically regardless of any pending operations with higher execution priorities.

In another embodiment, the adjustment module 604 interrupts or otherwise adjusts an executing operation in response to detecting one or more pending operations with higher execution priorities than the executing operation. In this manner, the adjustment module 604 does not interrupt an executing operation unless one or more pending operations with higher execution priorities have been received. In a further embodiment, the adjustment module 604 may interrupt or otherwise adjust operations both periodically and dynamically in response to pending operations.

The adjustment module 604, in certain embodiments, may interrupt or otherwise adjust a single operation multiple times. For example, after interrupting an executing operation in response to one or more pending operations with higher execution priorities and resuming the executing operation, the adjustment module 604 may re-interrupt or re-adjust the executing operation a second time in response to one or more subsequent pending operations with higher execution priorities than the executing operation. The adjustment module 604 may determine whether or not to interrupt or otherwise adjust an executing operation to ensure that the executing operation completes and is not starved. In one embodiment, once the schedule module 608 resumes an interrupted operation, the adjustment module 604 does not re-interrupt or re-adjust the executing operation so that the executing operation completes execution within a predetermined time period, even if one or more subsequent operations are received with higher execution priorities than the executing operation.

In one embodiment, the operation management apparatus 122 includes an adaptive module 610. The adaptive module 610 dynamically adapts one or more characteristics of adjustments for operations over time as characteristics of the data storage media 110 change. A characteristic of the data storage media 110, as used herein is a quality, behavior, attribute, or statistic of one or more storage cells of the data storage media 110 or of operations executing on the one or more storage cells. Examples of characteristics of the data storage media 110, in various embodiments, may include an operation duration or execution time, a program/erase cycle count, an age, an uptime statistic, storage operation errors, data errors such as a bit error rate, an uncorrectable bit error rate, or the like.

As a NAND data storage device 102 ages, erase operations typically take longer due to trapped charges in tunnel oxides and device material interfaces, amplifying the effects that erase operations have on the latency of other operations. The adaptive module 610, in certain embodiments, compensates for such changes in characteristics of the storage media 110 by adapting adjustments for the adjustment module 604 over time. The adaptive module 610 may adapt an adjustment in response to a change of a predefined magnitude, a change that satisfies an adaptation threshold, or the like. In one embodiment, the adaptive module 610 may determine a characteristic for an adjustment using a set of predefined adjustment rules that output an adjustment or adjustment characteristic based on characteristics of the data storage media 110, or the like.

For example, in various embodiments, the adaptive module 610 may adjust a number of times that the adjustment module 604 interrupts an executing operation, a frequency with which the adjustment module 604 interrupts an executing operation, a timing or position within an executing operation at which the adjustment module 604 interrupts the operation, or may otherwise adapt an adjustment for the adjustment module 604. One of skill in the art, in light of this disclosure, will recognize other manners in which the adaptive module 610 may adapt an adjustment over time for the adjustment module 604.

In one embodiment, the monitoring module 602 monitors one or more characteristics of the data storage media 110 for the adaptive module 610. The monitoring module 602, in certain embodiments, may monitor attributes of operations executing on the data storage media 110, such as an operation duration or execution time, operation errors, or the like. In a further embodiment, the monitoring module 602 may monitor data errors for the data storage media 110, such as a bit error rate, an uncorrectable bit error rate, or the like, and the adaptive module 610 may dynamically adapt adjustments for the adjustment module 604 based on the monitored values from the monitoring module 602.

Figure 7:
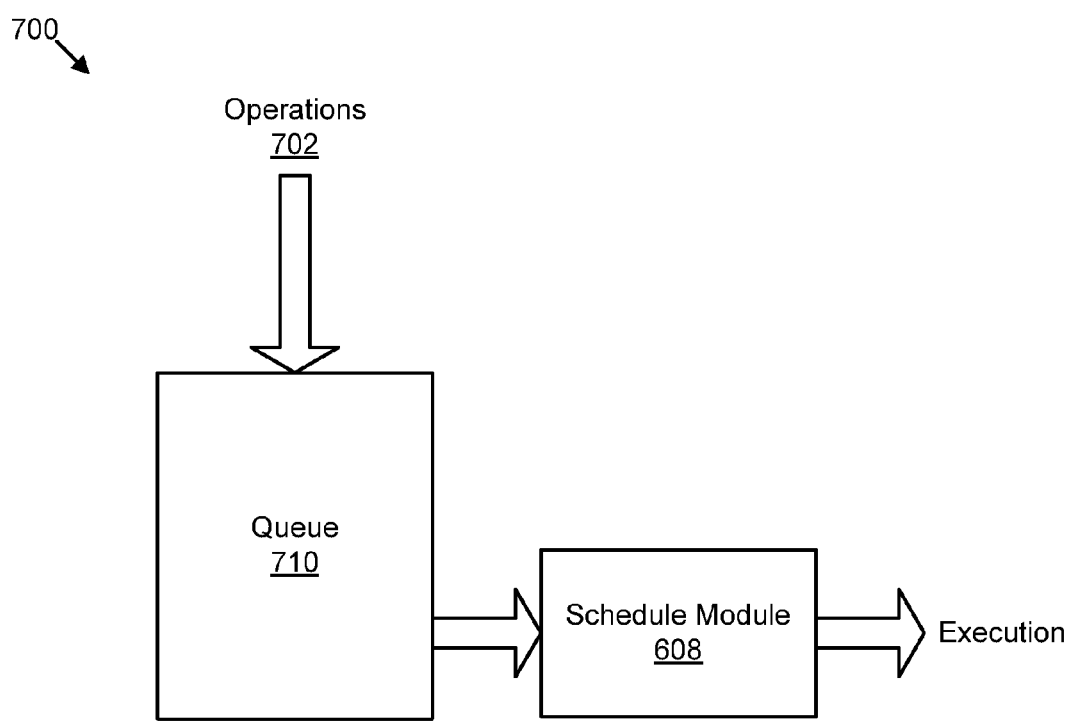
FIG. 7 is a schematic block diagram illustrating one approach to managing operations.

FIG. 7 shows one embodiment 700 of an operation management apparatus 122 managing execution of operations. Operations 702 may be placed in a queue 710 for execution. Other data structures than a queue 710 may also be used. The operations 702 may be, for example, write operations, read operations, erase operations, I/O operations, management operations such as storage device management operations and the like.

The schedule module 608 may manage the queue 710 and select operations 702 from the queue 710 for execution. The schedule module 608 may use the information about the context of currently executing operations and queued operations, in selecting and scheduling operations 702 for execution. In typical embodiments, the schedule module 608 selects operations 702 such that high latency operation performance impacts are mitigated.

In certain embodiments, the schedule module 608 uses a credit or token system to manage the queue 710. In one embodiment, the schedule module 608 may receive a credit when an operation 702 is placed in the queue 710, and delete a credit when an operation 702 is removed from the queue 710 for execution, or the like. The schedule module 608 may stop accepting operations 702 when the number of credits reaches or exceeds a predetermined amount. Other approaches to managing the size of the queue 710 may be used. Other approaches to queue management may also be used. The credit approach may be used for scheduling the start of operations.

Each operation in the set, in one embodiment, has an associated operation type, such as erase, write/program, read, or the like. The operations, in one embodiment, have a plurality of different operation types. In another embodiment, the operations have a single operation type. For example, in one embodiment, the set of concurrent operations come from a queue of a single type of operations, such as erase operations, or the like.

In a further embodiment, the schedule module 608 schedules certain types of operations separately or independently, or may ignore certain types of operations. In one embodiment, the schedule module schedules no more than a predefined number of erase operations to start concurrent execution.

Generally, the storage elements are configured such that once an operation is initiated, the storage elements do not provide a command to interrupt an executing operation. Consequently, in certain embodiments, a reset command is used to interrupt an executing command on a particular bank. In addition, toggling power to the storage elements of a bank may be used. Alternatively, or in addition multi-phase commands may be made available by storage element manufacturers and may be used and may be interruptable.

Figure 8A:
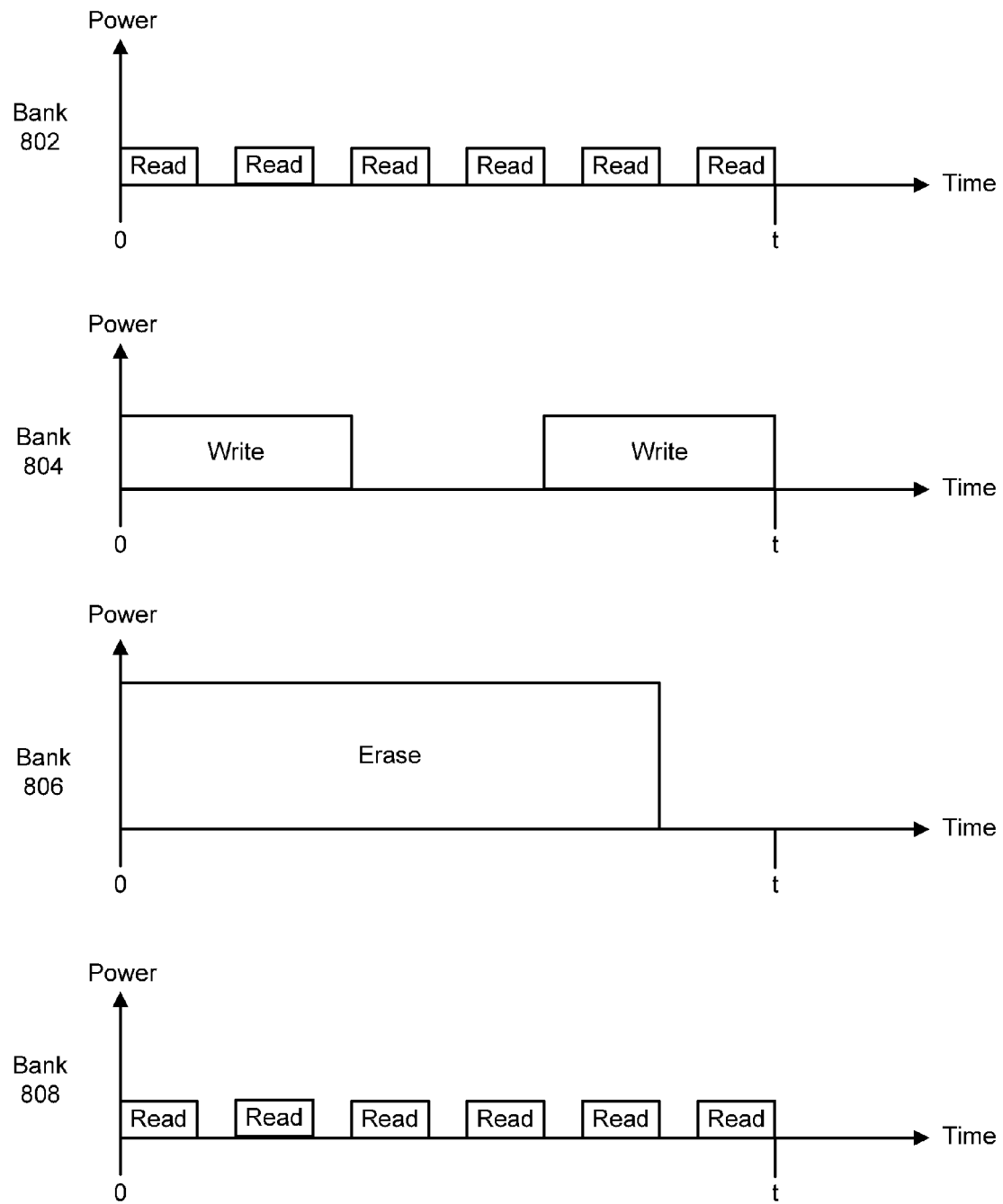
FIG. 8A is another diagram illustrating a difference in latencies for different operation types including I/O operations and management operations.

In certain embodiments, and as shown in FIG. 8A, a solid state storage device has banks 802, 804, 806, and 808. In a storage device with interleaved controllers for the banks 802, 804, 806 and 808, as described above, the storage device can process multiple read, write, and erase operations simultaneously as the banks operate in parallel. In one embodiment, the banks 802 and 808 perform read operations while the bank 804 performs write operations, and the bank 806 performs an erase operation. In the depicted embodiment, the bank 808 illustrates that while Bank 806 performs a single erase up to 5 separate read operations could be serviced. Consequently, the time savings of interrupting the erase executing on bank 806, if there are pending read operations address to bank 806 is clear.

Figure 8B:
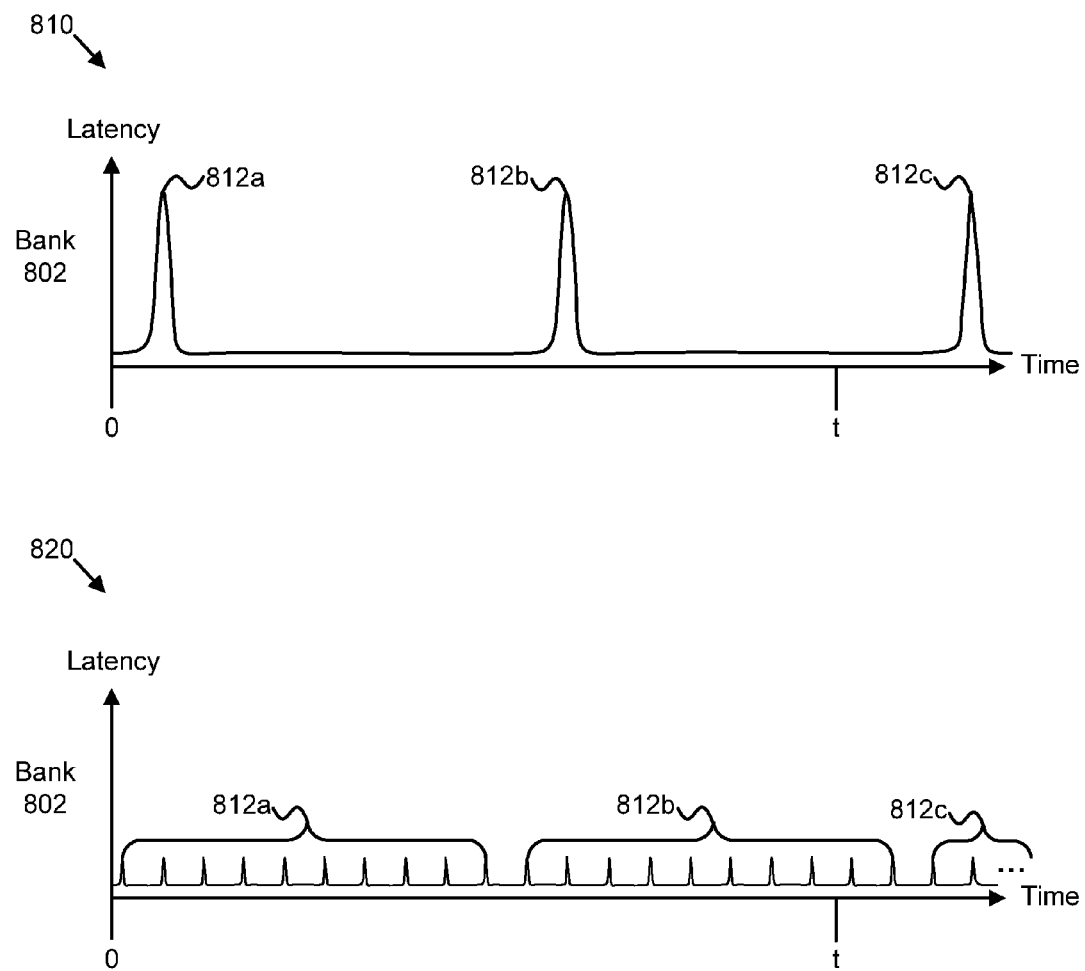
FIG. 8B is a further diagram illustrating a difference in latencies for different operation management methods.

FIG. 8B depicts a difference in latencies for different operation management methods. FIG. 8B depicts a first graph 810 illustrating operation latency on bank 802 without the adjustment module 604 interrupting executing operations, such as erase operations, bulk write operations, or the like, to allow pending operations to execute. As described above, in certain embodiments, while an erase operation is executing for a logical erase block, other logical erase blocks of the same bank 802 may not be accessible for other operations. For example, each die of the data storage media 110 may only be capable of using a single voltage at a time, so an entire die may be busy during execution of an erase operation for a single erase block. Similarly, multiple storage elements may be coupled to form a bank 802 of data storage elements that executes operations in parallel, so that a single operation executes on the bank 802 of storage elements at a time.

In the first graph 810, the latency for pending operations on the bank 802 increases sharply during execution of erase operations 812, since the pending operations are queued while the erase operations 812 execute. For example, read operations, or the like, wait while erase operations 812, bulk write operations, or the like execute, causing a storage client or user to experience periodic increases in read latency. Certain applications or use cases of the data storage media 110 may be particularly sensitive to changes in latency and may operate more efficiently with consistent latency. For example, if the data storage device 102 is used with a database system or in a RAID array with another data storage device 102, spikes in latency may be particularly problematic. The three spikes in latency, in the depicted embodiment, correspond to a first erase operation 812a, a second erase operation 812b, and a third erase operation 812c.

In the second graph 812, the adjustment module 604 interrupts the erase operations 812 over time, allowing pending operations to execute on the bank 802 prior to completion of the erase operations 812. By breaking the erase operations 812 up into discrete segments, the latency for pending operations is more consistent, replacing the large spikes in latency depicted in the first graph 812 with a series of smaller spikes corresponding to each phase of the interrupted erase operations 812. For use cases and applications that are sensitive to inconsistent latency or to high latency, in the second graph 820, the latency is more consistent and the maximum latency is much lower than in the first graph 810 where the adjustment module 604 does not interrupt erase operations 812. While the description of FIG. 8B has been relative to erase operations 812, in other embodiments, a bulk write (program) operation, or other management operations may cause similar increases in latency, and the adjustment module 604 may interrupt and/or adjust other types of operations.

Figure 9:
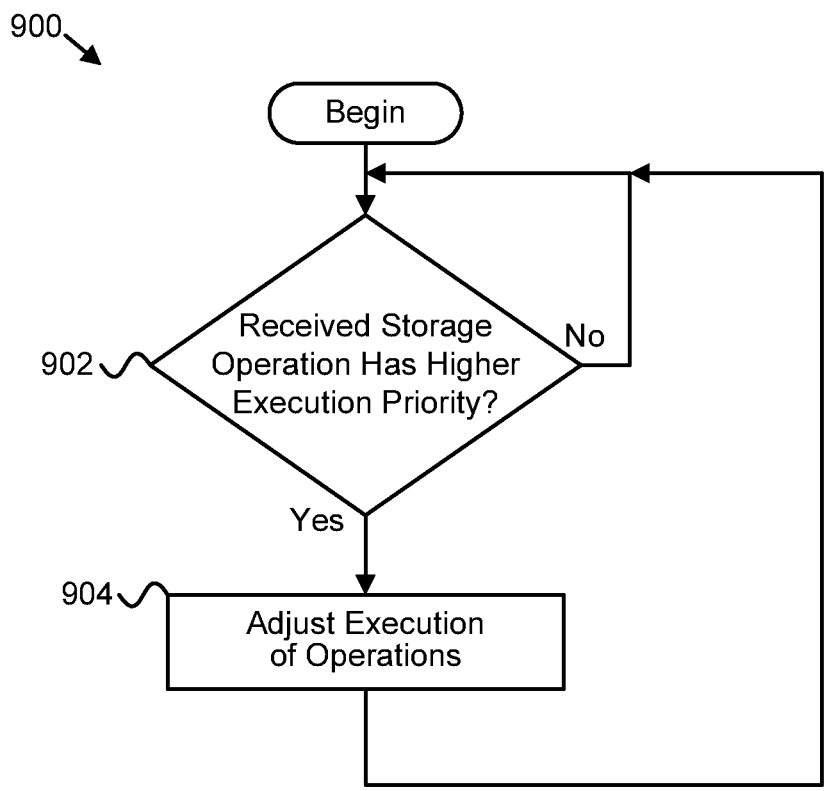
FIG. 9 is a schematic flow chart diagram illustrating one embodiment of a method for managing operations for data storage media.

FIG. 9 depicts one embodiment of a method 900 for managing operation throughput in a storage device 102. The method 900 begins, and the monitoring module 602 monitors 902 data storage requests received by the data storage device 102 to determine if a received storage operation has a higher execution priority than an executing storage operation. In the depicted embodiment, if the monitoring module 602 determines 902 that one or more the received data storage requests have higher execution priorities than an executing operation, the adjustment module 604 adjusts 904 execution of the executing operation on the data storage device 102. In various embodiments, the method 900 of FIG. 9 may be combined into a single system, method, or apparatus.

Figure 10:
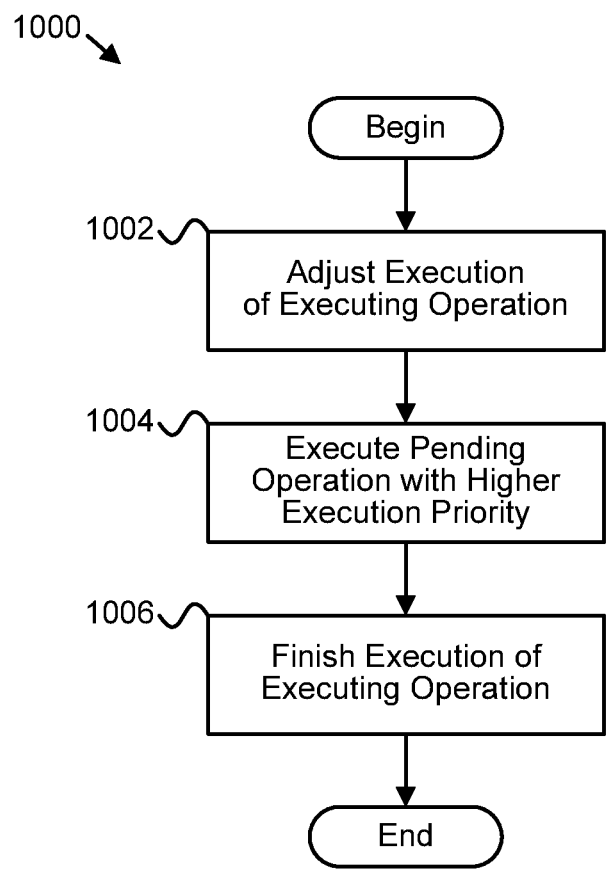
FIG. 10 is a schematic flow chart diagram illustrating another embodiment of a method for managing operations for data storage media.

FIG. 10 depicts an embodiment of a method 1000 for managing operations for data storage media 110. The method 1000 begins, and the adjustment module 604 adjusts 1002 execution of an executing operation on the data storage media 110. The adjustment module 604 may adjust 1002 the execution of the executing operation periodically, in response to a pending operation with a greater execution priority, or the like.

The schedule module 608 executes 1004 a pending operation on the data storage media 110 in response to the adjustment module 604 adjusting 1002 execution of the executing operation. The schedule module 608 finishes 1006 execution of the executing operation in response to completing execution 1004 of the pending operation and the method 1000 ends.

Figure 11:
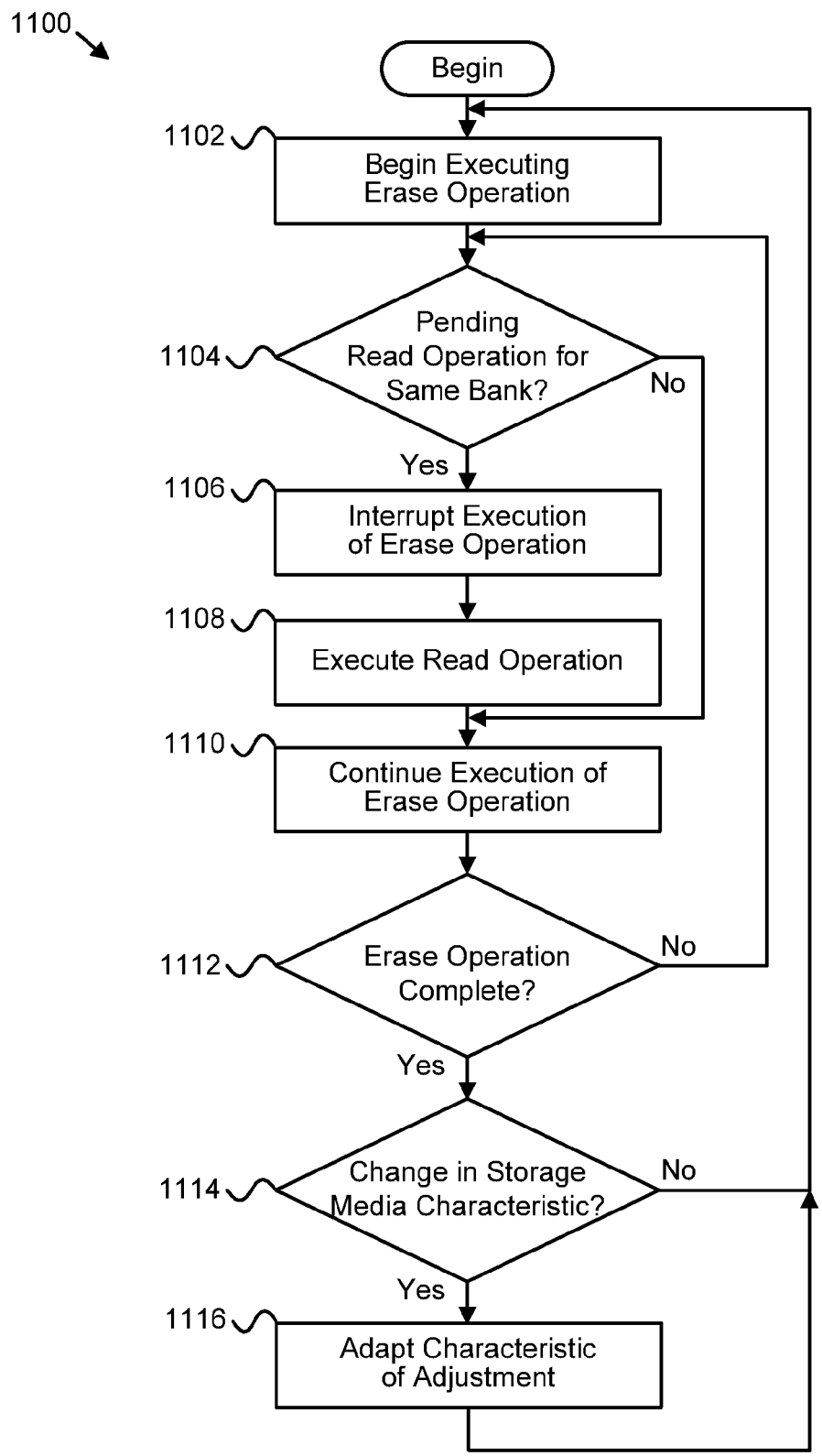
FIG. 11 is a schematic flow chart diagram illustrating a further embodiment of a method for managing operations for data storage media.

FIG. 11 depicts a further embodiment of a method 1100 for managing operations for data storage media 110. The method 1100 begins and the schedule module 608 begins executing 1102 an erase operation on a bank 214 of data storage media 110. The monitor module 602 determines 1104 whether there are one or more pending read operations for the same bank 214. If there are no pending read operations for the same bank 214, the schedule module 602 continues execution 1110 of the erase operation. If the monitor module 602 determines 1104 that there are one or more pending read operations for the same bank 214, the adjustment module 604 interrupts 1106 execution 1102 of the erase operation and the schedule module 608 executes 1108 the one or more pending read operations. In response to completing execution 1108 of the one or more pending read operations, the schedule module 608 continues execution 1110 of the erase operation.

The schedule module 608 determines 1112 whether the erase operation is complete. If the schedule module 608 determines 1112 that the erase operation is not yet complete, the monitor module 602 continues to determine 1104 whether there are pending read operations for the same bank 214, and the adjustment module 604 may re-interrupt 1106 or otherwise readjust execution of the erase operation until the schedule module 608 determines 1112 that the erase operation is complete.

When the schedule module 608 determines 1112 that the erase operation is complete, the adaptive module 610 determines whether one or more characteristics of the data storage media 110 have changed, using data that the monitor module 602 collects over time or the like. If the adaptive module 610 determines 1114 that one or more characteristics of the data storage media 110 have changed, the adaptive module 610 dynamically adapts 1116 a characteristic of an adjustment for the adjustment module 604 to make on a subsequent operation and the method 1102 continues with the schedule module 608 executing 1102 a subsequent erase operation. If the adaptive module 610 determines 1114 that one or more characteristics of the data storage media 110 have not changed, the method 1100 also continues with the schedule module 608 executing 1102 a subsequent erase operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   aborting the execution of an executing operation on data storage media;
   executing a pending operation on the data storage media in response to aborting execution of the executing operation, the pending operation comprising a higher execution priority than the executing operation;
   initiating execution of the aborted executing operation in response to completing execution of the pending operation; and
   adapting an adjustment characteristic to limit a number of aborts of the executing operation.

2. The method of claim 1, wherein the executing operation comprises one or more of a cumulative command and a multi-phase command.

3. The method of claim 1, wherein a higher execution priority comprises the pending operation comprising a shorter execution time than the executing operation.

4. The method of claim 1, wherein the executing operation comprises an erase operation and the pending operation comprises a read operation.

5. The method of claim 1, wherein the executing operation and the pending operation are each configured for execution on a plurality of storage elements coupled to execute a single operation on the plurality of storage elements.

6. The method of claim 5, wherein the plurality of storage elements comprise a single bank of non-volatile solid-state storage elements coupled in parallel.

7. The method of claim 1, further comprising dynamically adapting one or more characteristics of a subsequent adjustment for a subsequent operation in response to a change in one or more characteristics of the data storage media over time.

8. The method of claim 1, wherein initiating execution comprises finishing execution of the executing operation without readjusting execution of the executing operation in response to one or more subsequent pending operations comprising a higher execution priority than the executing operation such that the executing operation completes execution within a predetermined time period.

9. The method of claim 1, wherein aborting execution occurs at a predefined periodic interval.

10. The method of claim 1, wherein aborting execution occurs in response to detecting the pending operation.

11. The method of claim 1, wherein the executing operation comprises a native multi-phase non-volatile storage media primitive command configured to allow execution of other operations between phases of the native multi-phase non-volatile storage media primitive command.

12. The method of claim 1, wherein the executing operation comprises a data storage device management operation for the data storage media and the pending operation comprises an I/O operation for the data storage media.

13. The method of claim 1, wherein the executing operation comprises an erase operation.

14. The method of claim 1, wherein the executing operation comprises a program operation.

15. The method of claim 1, wherein the executing operation comprises a read operation.

16. The method of claim 1, wherein separating the executing operation into multiple segments increases the latency of the executing operation.

17. A method comprising:
- interrupting execution of a first operation on data storage media;
- executing a pending operation on the data storage media in response to interrupting execution of the first operation, the pending operation comprising a higher execution priority than the executing operation, wherein interrupting execution of the first operation comprises selecting operations from one or more queues of operations to be executed such that the pending operation executes prior to the first operation;
- interrupting execution of the first operation when additional pending operations have a higher priority than the first operation;
- adjusting an adjustment characteristic to limit the number of interrupts of the first operation; and
- executing the first operation in response to completing execution of the pending operation.

18. The method of claim 17 wherein the first operation is inserted into the one or more queues prior to the pending operation such that the first operation and the pending operation execute out of a received order.

19. The method of claim 17, wherein the executing operation comprises one of an erase operation, a program operation, and a read operation.

20. The method of claim 17, wherein the pending operation comprises one of an erase operation, a program operation, and a read operation.

21. The method of claim 17, further comprising limiting the number of additional interrupts based on the frequency of the interrupts.

22. An apparatus comprising:
- an adjustment module configured to interrupt execution of an executing operation on data storage media;
- a schedule module configured to execute a pending operation on the data storage media in response to interrupting execution of the executing operation, the pending operation comprising a shorter execution time than the executing operation;
- an adaptive module configured to dynamically adapt an adjustment characteristic of the adjustment module to limit a number of interrupts of the executing operation; and wherein the schedule module finishes execution of the executing operation in response to completing execution of the pending operation and wherein the adjustment module, the schedule module, and the adaptive module comprise one or more of logic hardware and executable code, the executable code stored on one or more non-transitory computer readable storage media.

23. The apparatus of claim 22, wherein the executing operation comprises an erase operation and the pending operation comprises a read operation received during execution of the erase operation.

24. The apparatus of claim 23, wherein the data storage media characteristics comprises an operation execution time.

25. The apparatus of claim 22, wherein the executing operation and the pending operation are each configured for execution on a single bank of non-volatile solid-state storage elements coupled to execute a single operation on the bank of storage elements.

26. The apparatus of claim 22, wherein the data storage media characteristics comprise an operation execution time, a program/erase cycle count, an age, an uptime statistic, storage operation errors, data errors such as a bit error rate, an uncorrectable bit error rate, or combinations thereof.

27. A system comprising:
- non-volatile solid-state data storage media;
- a storage controller for the non-volatile solid-state data storage media, the storage controller comprising,
  - an adjustment module configured to abort execution of an executing erase operation on the data storage media;
  - a schedule module configured to execute a pending read operation on the data storage media in response to aborting execution of the executing operation, the pending read operation comprising a shorter execution time than the executing operation; and
  - an adaptive module configured to adjust an adjustment characteristic of the adjustment module to limit a number of aborts of the executing operation.

28. The system of claim 27, further comprising a host device and a data storage device comprising the data storage media, the data storage device in communication with the host device over one or more communications buses.

29. The system of claim 28, wherein at least a portion of the storage controller comprises a device driver for the data storage device executing on a processor of the host device.

* * * * *